United States Patent
Maione et al.

(10) Patent No.: US 8,078,169 B2
(45) Date of Patent: Dec. 13, 2011

(54) METHODS AND DEVICES FOR SET-UP OF A CALL IN AN INTELLIGENT NETWORK

(76) Inventors: Biagio Maione, Naples (IT); Alfonso Pisani, Scafati (IT)

(*) Notice: Subject to any disclaimer, the term of this patent is extended or adjusted under 35 U.S.C. 154(b) by 1031 days.

(21) Appl. No.: 11/945,959

(22) Filed: Nov. 27, 2007

(65) Prior Publication Data
US 2008/0261578 A1    Oct. 23, 2008

(51) Int. Cl.
*H04Q 11/00* (2006.01)
*H04M 3/42* (2006.01)
(52) U.S. Cl. ............... 455/435.1; 370/260; 455/416
(58) Field of Classification Search ............ 455/435, 455/416; 709/217; 370/260
See application file for complete search history.

(56) References Cited

U.S. PATENT DOCUMENTS

| 7,586,857 B2* | 9/2009 | Ejzak et al. ............... 370/260 |
| 2005/0251563 A1* | 11/2005 | Berranger et al. ........... 709/217 |

FOREIGN PATENT DOCUMENTS
EP    1592217 A    11/2005
* cited by examiner

*Primary Examiner* — George Eng
*Assistant Examiner* — Nizar Sivji

(57) ABSTRACT

Methods and devices for set-up of a call in an intelligent network (300) comprising a switching entity (SE-31,SE10, SSF) and a control entity (CE-31,CE10,SCP) are described. The call is subjected to a control by the control entity (CE-31,CE10,SCP) and the control entity (CE-31,CE10,SCP) is adapted to perform the steps of obtaining (S510) information indicating a status of a bearer for the call, determining (S520) a bearer establishment procedure for the call by analyzing the obtained information indicating the status of the bearer and at least one requirement related to the call, and sending (S530) an instruction to the switching entity (SE-31,SE10,SSF) to initiate an establishment of the bearer for the call according to the determined bearer establishment procedure.

24 Claims, 14 Drawing Sheets

METHODS AND DEVICES FOR SET-UP OF A CALL IN AN INTELLIGENT NETWORK

This application claims the benefit of International Application No. PCT/EP2006/070158, filed Dec. 22, 2006, the disclosure of which is incorporated herein by reference.

FIELD OF THE INVENTION

The present invention relates to communication networks, in particular to methods and devices for set-up of a call in an intelligent network.

BACKGROUND OF THE INVENTION

The separation of the control level from the bearer level is a rather new feature in a core network of a mobile communication system. The separation is done by dividing the tasks of a Mobile Switching Center (MSC) between a Media Gateway (MGW) and a MSC Server (MSC-S). A MSC-S basically performs control tasks while a MGW acts as a translation unit between disparate telecommunications networks.

Control tasks of a MSC-S may comprise call control of all circuit-switched services, user plane control and media gateway control. Similar tasks may be performed by so-called Gateway MSC-S (GMSC-S) or Transit Switching Center Server (TSC-S). In order to ease the understanding, in the further parts of this application it will not be differentiated between MSC-S, GMSC-S, and TSC-S or the like but instead it will be referred to a generalized term "Switching Server" (SS).

Media Gateways enable voice and/or multimedia communications over multiple transport protocols such as Asynchronous Transfer Mode (ATM) and Internet Protocol (IP). A MGW is the termination point for external networks and the interface between the core network and the radio network. It terminates circuits and packet streams and may support media conversion, bearer control and payload processing.

For a call, a bearer has to be established along the communication path between the calling and the called party. Tasks of a SS are the selection of a MGW and of bearer characteristics like codecs for bearer segments interfacing the selected MGW. Typically, the selection of the MGW and the codec happen in parallel. Tasks of a (selected) MGW are to establish at least one bearer segment according to the selected bearer characteristics. Furthermore, a MGW may perform media conversion, bearer control, and payload processing.

Either "forward bearer establishment" or "backward bearer establishment" may be used as specified in $3^{rd}$ Generation Partnership Project Technical Specification (3GPP TS) 23.205 V.7.2.0 (2006-06). "Forward bearer establishment" is also known as "deferred MGW selection" and "backward bearer establishment" is also denoted as "non-deferred" or "immediate MGW selection", because a main differentiating feature between the two bearer establishment procedures relates to timing and responsibility of a first selection of a MGW for a call. According to backward bearer establishment, the originating SS performs a first MGW selection and subsequently the terminating SS performs a second MGW-selection and vice versa for forward bearer establishment.

For forward bearer establishment, the originating SS is provided with information about the MGW-selection already performed by the terminating SS. Furthermore, the originating SS is provided with bearer information (information about bearer characteristics) from the terminating side. Accordingly, the originating SS can take MGW-selection information and bearer information from the terminating side already into account when performing MGW-selection at the originating side for establishing the bearer in an optimized way. According to backward bearer establishment, the SS at the terminating side is not provided with such information from prior MGW-selection and not with bearer information from the originating side.

Forward and backward bearer establishment are further explained in more detail with reference to FIG. 1 for a call originating from a terminal T1 on an originating side to a terminal T2 on a terminating side. Furthermore, depicted are switching servers SS-1,SS-2 and media gateways MGW-1, MGW-2 on the respective originating and terminating side as well as network N1 on the originating side and network N2 on the terminating side. Networks N1,N2 are usually networks with different transmission characteristics, e.g. network N1 may be a Radio Access Network and network N2 may be a Public Switched Telecommunications Network (PSTN), Integrated Service Digital Network (ISDN), or a further Public Land Mobile Network (PLMN network), and one or more media gateways MGW-1,MGW-2 are needed to establish the bearer end-to-end adapted to the capabilities of the interfacing links, networks, and devices. Hence, bearers segments B11,B12,B13 may have to be established to accomplish for a bearer for the call. The communication system 100 may comprise further entities not depicted for illustrative reasons, e.g. a Home Location Register (HLR).

According to backward bearer establishment for a call to terminal T2 originating at terminal T1, a first MGW selection is performed as soon as a request for a call is made at switching server SS-1, which selects media gateway MGW-1. According to forward bearer establishment, switching server SS-1 does not select any MGW but forwards an Initial Address Message to switching server SS-2 which selects media gateway MGW-2 according to first MGW selection. Subsequently, the respective second MGW selection can take place, i.e. media gateway MGW-2 is selected by switching server SS-2 for backward bearer establishment and media gateway MGW-1 or media gateway MGW-2 is selected by switching server SS-1 for forward bearer establishment, and the bearer can be set-up along bearer segments B11,B12,B13 as described for mobile originating and mobile terminating examples in 3GPP TS 23.205 V.7.2.0 (2006-06) herewith included by reference.

A resource efficient arrangement of a communication network 100 is depicted in FIG. 2 wherein a bearer for a call to terminal T2 originating at terminal T1 has been established according to forward bearer establishment. Switching server SS-1 has received information about the previous selection of the MGW on the terminating side and has selected the same media gateway MGW-2 as previously been selected by the switching server SS-2. Accordingly, a reduced number of media gateways and bearer segments are used compared to FIG. 1.

An inherent feature of the Intelligent Network (IN) concept is that service intelligence is separated from switching functions. This separation basically enables network operators to develop and deploy services and features independently of vendors, allowing more flexibility in service development, simplified rollout, reduced costs and greater autonomy. Examples for IN are the Intelligent Network Application Protocol (INAP), the Advanced IN (AIN), and the Customized Applications for Mobile network Enhanced Logic (CAMEL). INAP was developed for fixed line networks and is the primary protocol used for fixed line IN outside of North America. AIN is a variant developed for North America.

CAMEL is a Global System for Mobile Communications (GSM) Phase 2+ and Wideband Code Division Multiple Access (WCDMA) network feature standardized according to 3GPP TS 22.078. CAMEL is based upon core INAP with modifications to take into account subscriber mobility. In particular, CAMEL enables the use of operator-specific services by a subscriber even when roaming outside the subscriber's Home Public Land Mobile Network (PLMN). A CAMEL-IN comprises as main entities a gsmSSF (GSM Service Switching Function) for switching tasks and a gsmSCF (GSM Service Control Function) comprising the service intelligence or logic.

The layered architecture and the IN are fairly separate concepts. In general, however, establishing a bearer for a call independently from the IN service logic can be problematic. For example, some IN services may be provided only, or at a better quality, for particular bearer establishment procedures or bearers only.

Furthermore, especially for multiparty calls like conferencing, individual bearer segments may be incompatible because of incompatible or not connectable MGWs and/or incompatible codecs. Drawbacks apply for the so-called "automatic backward selection feature". The automatic backward selection feature can be installed at a gsmSSF and forces the gsmSSF for any call to always initiate backward bearer establishment which is not appropriate for many calls.

SUMMARY OF THE INVENTION

It is therefore an object of the invention to provide methods, devices, and computer programs that overcome the aforementioned problems and improve the set-up of a call in an intelligent network.

A method for set-up of a call in an intelligent network comprising a switching entity and a control entity is described. The call is subjected to a control by the control entity of the intelligent network. The term "call" has to be interpreted broadly and may represent e.g. at least one of a voice call, a multimedia service, and a data transmission. The control entity may perform control as described in the following.

First of all, information indicating a status of a bearer for the call may be determined. Said determination of information may be explicit, e.g. by reception of a message indicating the status of the bearer, or implicit, e.g. for a call initiated by the control entity, the control entity may be pre-configured to know at the time of initiation of the call that no bearer has been selected yet.

The control entity determines a bearer establishment procedure for the call. A bearer establishment procedure relates to an establishment of one or more bearers for the call. The control entity may analyze the obtained information indicating the status of the bearer and at least one requirement related to the call. Within the analysis it may be checked if a bearer has already been established (or not) or if particularities of a bearer like a particular MGW or particular codec have been selected (or not). In addition, at least one call-related requirement is taken into account. For example, the type of a call may be call-related requirement as for a voice call that is subjected to control of a control entity. the call-related requirements can be very different from the requirements for a multimedia call or for data transmissions. Different call-related requirements may exist for pre-paid or post paid calls or with respect to the calling parties, e.g. if the call is a call between two calling terminals or is a multiparty call, i.e. including more than two terminals or at least two destinations for a call being control-entity originated. Origin of initiation of a call, operator-affiliation and location of at least one of the parties of the call are further examples for call-related requirements that may be considered in the analysis. A further example for a call-related requirement that may influence the determination of a bearer establishment procedure is an interaction with a terminal during call set-up like e.g. playing out a control entity initiated announcement to a user.

Thus, in the analysis, the type and/or source of the call as well as one or more types of and/or destinations for user interactions may be checked as call-related requirements in addition to the obtained bearer status information and a bearer establishment procedure for the call can be determined based on these information inputted into the logic of the control entity. The logic may be adapted to use further information as input for determining the bearer establishment procedure in an optimized manner, e.g. traffic information. The logic may use one or more algorithms and/or look-up tables that provide a bearer establishment procedure as output when bearer status information and at least one call-related requirement are inputted.

As a result of the analysis, the control entity may generate an instruction for the switching entity to initiate the determined bearer establishment procedure. The instruction is sent from the control entity to the switching entity and instructs the switching entity to initiate an establishment of the bearer for the call according to the determined bearer establishment procedure.

The invention provides for a control of the bearer establishment procedure by a control entity of an intelligent network. Now, a bearer for a call can be established in a controlled way in the call-set-up phase. Bearer status information and requirements related to the call are taken into account and an optimized bearer establishment procedure can thus be determined and executed. Accordingly, the control entity may optimize the bearer establishment according to various criteria in order to e.g. establish bearers in a resource efficient way by determining a bearer establishment procedure that aims at minimizing the number of MGWs like a forward bearer establishment procedure. Or it may order the bearer establishment for MGWs that can be connected in a non-complicated and/or otherwise inexpensive manner, e.g. by connecting only MGWs of a particular operator or within a particular location. Introducing a control entity controlled determination of a bearer establishment procedure into the call-set up phase further decreases the probability that calls get lost as the probability of incompatible bearer segments (e.g. due to incompatible MGWs and/or codecs) is significantly decreased.

The information indicating the status of the bearer for the call may refer to a selection status of the bearer, i.e. it may be indicated that a bearer or one or more bearer parts like a MGW or codec has been or has not been selected. The appropriate bearer establishment procedure can be then determined considering at least one call-related requirement, e.g. for a terminal initiated call to a second terminal a forward bearer selection procedure may be preferably determined. On the other hand, if the calling entity requires a connection to multiple parties in parallel (call requirement for a multiparty call), a backward bearer establishment procedure may be preferred.

The bearer establishment procedure may relate to a selection of at least one of a media gateway and a codec. Hence, the instruction may instruct the switching entity to perform a particular bearer establishment procedure, e.g. the instruction may relate to the initiation of a backward bearer establishment procedure or a forward bearer establishment procedure and may be implicit or explicit. Alternatively, or in addition, the instruction may instruct the switching entity to initiate a selection of at least one of a MGW, codec, MGW type, and codec type.

According to another preferred embodiment, the information indicating the status of the bearer is received via an initial message. Preferably, the initial message comprises a dedicated information element for indicating the status of the bearer. The usage of an initial message provides that the control entity is informed about the status of the bearer at a very early (initial) state in the call set-up procedure. Preferably, the first call-related message that is received from the switching entity, e.g. for invoking intelligent service activation at the control entity, comprises the information element. The information element is preferably dedicated. i.e. pre-defined values may be used for indication of the bearer status at pre-defined positions within the initial message with the pre-definitions known to both the control entity and the switching entity. A common notation with pre-defined values and a pre-defined position of the information element in the initial message eases the insertion and extraction value handling both for the switching and control entity. The initial message and the dedicated information element are preferably standardized although propriety extensions may be used in case standardization is not possible. All in all, the control entity is provided with bearer status information at an initial stage and is thus enabled to perform its control right away, at an early stage of the call set-up procedure.

According to another preferred embodiment, the information indicating the status of the bearer may be received from the switching entity. This embodiment may be especially useful for calls that are initiated by an entity externally from the control entity.

According to another preferred embodiment, the information indicating the status of the bearer is obtained from information indicating that the call is initiated by the control entity with origin of initiation of the call being used as an input call-related requirement for the analysis for determining the bearer establishment procedure. Accordingly, the control entity can determine an appropriate bearer selection procedure for control-entity initiated calls.

According to a preferred embodiment, intelligent network services may be added to the call for providing enriched call servicer e.g. for playing announcements within the call set-up phase or by including further services of an intelligent network to the call especially in the context of the bearer establishment phase. Accordingly, the control entity may invoke an intelligent network service procedure for the call and sends at least one instruction to perform an operation relating to the invoked intelligent network service to the switching entity. An invocation of an intelligent network service shall be preferably considered in the analysis for determination of the bearer establishment procedure, because the intelligent network service may be associated with further requirements. Accordingly, the analysis for the determination of the bearer establishment procedure may consider at least one call-related requirement being associated to an intelligent network service that is invoked or is to be invoked in the call set-up phase for optimizing the bearer establishment procedure also as to the requirements of the intelligent network service.

According to another preferred embodiment, at least one further information about a status of the bearer may be received from the switching entity at the control entity at a time subsequent to the sending of the instruction. Preferably, the control entity is notified about a result of the bearer establishment procedure according to its instruction. Thus, the control entity can take appropriate actions based on this at least one further information, e.g. to initiate at least one further bearer establishment procedure if the previous bearer establishment was successful or to determine an alternative bearer establishment procedure if the previously determined bearer establishment procedure was not successful. The further information may be received in timely intervals (e.g. periodically) such enabling the control entity to monitor the bearer establishment procedure over time, e.g. until the bearer or the call is established. The received status information may be further processed by the control entity. Alternatively or in addition, the received status information may be provided in processed or unprocessed form from the control entity to at least one further entity for e.g. statistical or charging purposes.

Said received at least one further information about a status of the bearer may trigger a determination of at least one further bearer establishment procedure for the call. Accordingly, the control entity may be configured to determine the at least one further bearer establishment procedure according to the received at least one further information. Furthermore in the analysis, at least one further requirement related to the call may be considered. The call-related requirement considered in the previous and the subsequent process for the determination of the previous and further bearer establishment procedure may be identical, of the same type or different from each other. The same applies in principle also for the information about the status of the bearer. As a result of the determination, at least one further instruction can be sent to the switching entity to instruct the switching entity to initiate an establishment of at least one further bearer according to the determined at least one further bearer establishment procedure. The previously determined and the at least one further determined bearer establishment procedure may be identical or different.

The transfer of the at least one further information about a status of the bearer may be especially useful for multiparty calls. In this case, the timing of the establishing of further call legs to include further participants (terminals) into the multiparty call can be crucial. Therefore, it is of advantage for the call being a multiparty call to initiate the establishing of further bearers for further call legs to the further participants of the multiparty call after the reception of an indication that the bearer (according to the previous instruction) was successfully established. Hence, the at least one further bearer establishment procedure preferably relates to an establishment of at least one call leg for the call being a multiparty call. The at least one further instruction may instruct the switching entity to initiate an establishment of the at least one call leg accordingly.

The invention further concerns a method with steps performed by a switching entity. Initial steps of the method may be dependent on the origin of the call.

If the call is initiated by a terminal, i.e. an end-terminal like an user equipment or any node external from the control entity, the following steps may be performed by the switching entity. First of all, a status of a bearer for the call can be determined. Information about the determined status of the call can then be sent to the control entity. Subsequently, from the control entity an instruction can be received to initiate an establishment of the bearer for the call according to a bearer establishment procedure determined by the control entity. Hence, the switching entity can initiate the establishment of the bearer according to the instruction.

Preferably, the information indicating the status of the bearer is sent via an initial message comprising a dedicated information element for indicating the status of the bearer. Furthermore, the information indicating the status of the bearer for the call may refer to a selection status of the bearer.

For a call initiated by the control entity, the switching entity may be configured to perform the following steps, i.e. to receive from the control entity an instruction to initiate an establishment of the bearer for the call according to a bearer establishment procedure determined by the control entity and then to initiate the establishment of the bearer according to the instruction.

Preferably, the bearer establishment procedure relates to a selection of at least one media gateway and/or at least one codec. Furthermore, the instruction may instruct the switching entity to perform a particular bearer establishment procedure, e.g. the instruction may relate to the initiation of a backward bearer establishment procedure or a forward bearer establishment procedure and may be implicit or explicit.

According to another preferred embodiment, the switching entity may be adapted to disable any pre-configured bearer establishment procedures for the call that is subjected to the control of the control entity at least until the instruction is received. Hence, any legacy switching entities still having bearer establishment procedures pre-configured can be adapted to interact with a control entity for a call that is subjected to the control of the control entity.

According to another preferred embodiment, the switching entity may receive at least one instruction to perform an operation relating to an intelligent network service invoked by the control entity. The switching entity follows the instruction and initiates this operation e.g. at the switching entity itself and/or at a further entity in the network.

According to another preferred embodiment the switching entity may determine at least one status of the bearer subsequent to the initiation of the bearer and send to the control entity at least one further information about the at least one subsequently determined status of the bearer. Furthermore, it may receive, in response to the sending of the at least one further information, from the control entity at least one further instruction to initiate an establishment of at least one further bearer for the call according to at least one further bearer establishment procedure determined by the control entity and can then initiate the establishment of the at least one further bearer according to the at least one further instruction.

According to another preferred embodiment, the at least one further bearer establishment procedure may relate to the establishment of at least one call leg for the call being a multiparty call. Hence, the switching entity is adapted to follow the instruction and initiates the establishment of the at least one call leg as instructed.

The invention furthermore concerns a control entity and switching entity. It furthermore concerns a computer program loadable into a processing unit of a control entity and a computer program loadable into a processing unit of a switching entity to perform any of the steps of the aforementioned methods when operated at the respective device.

In the following, detailed embodiments of the present invention shall be described in order to give the skilled person a full and complete understanding. However, these embodiments are illustrative and not intended to be limiting.

DETAILED DESCRIPTION OF THE INVENTION

Figure 1:
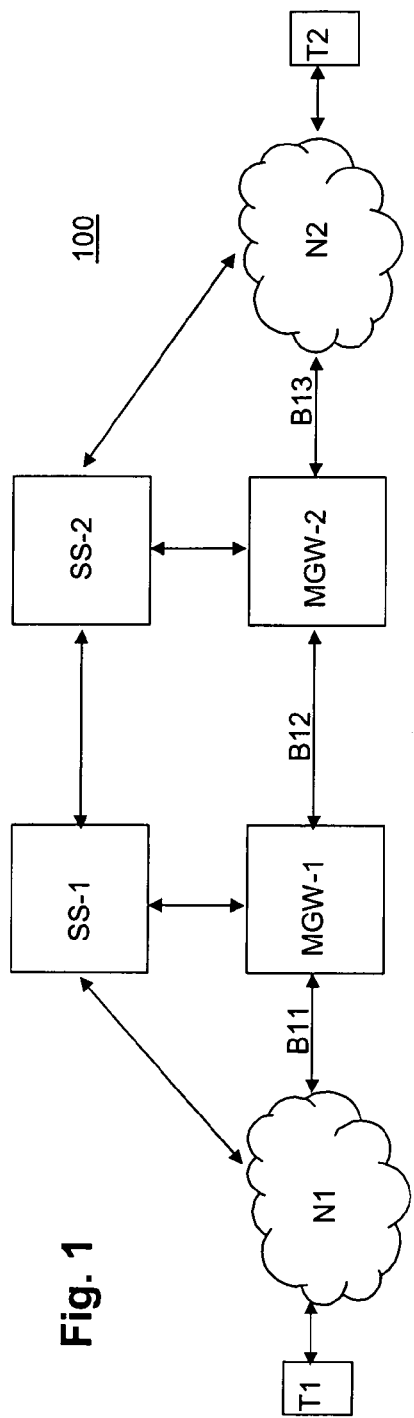
FIG. 1 shows a first schematic illustration of a communication network for a call between two terminals.
Figure 2:
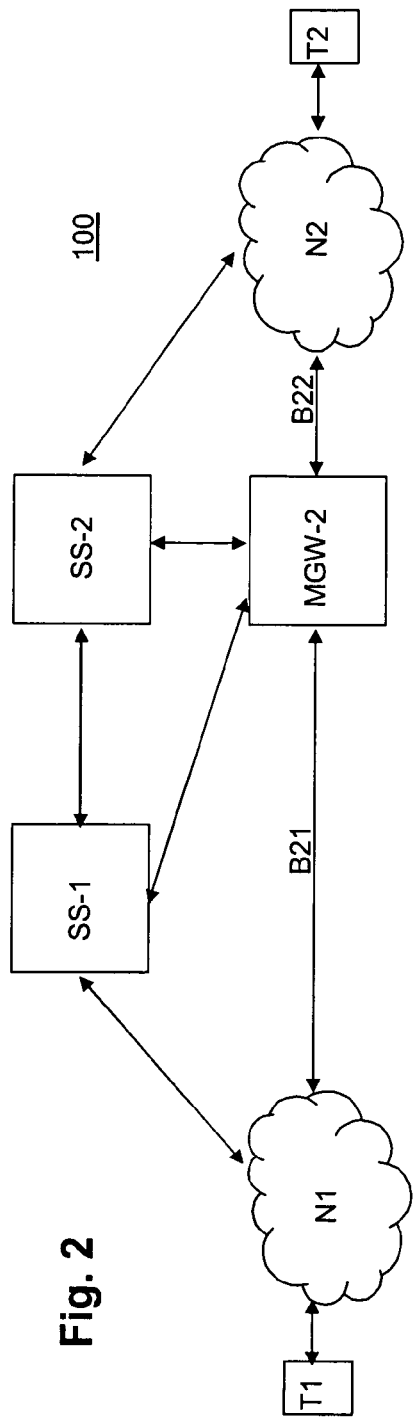
FIG. 2 shows a second schematic illustration of a communication network for a call between two terminals.
Figure 3:
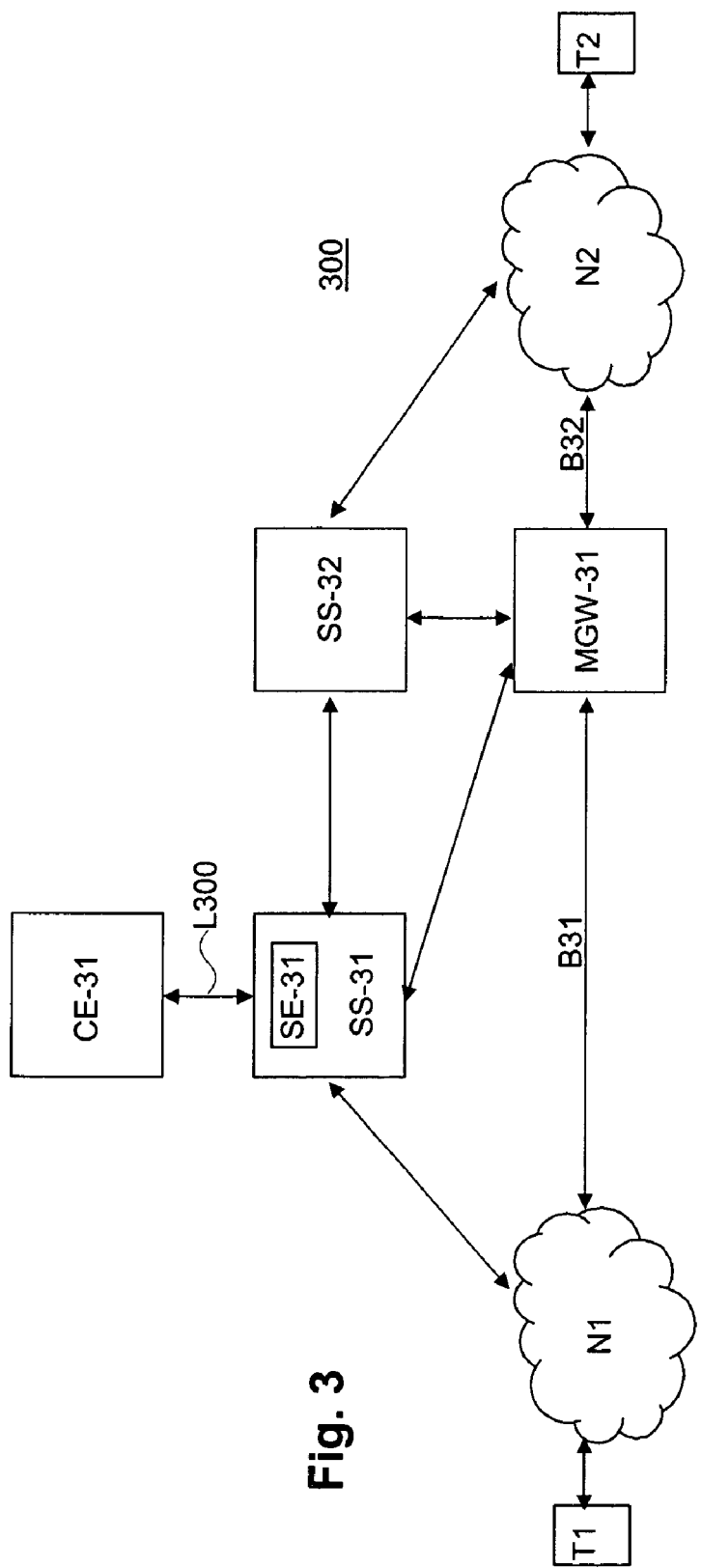
FIG. 3 shows a schematic illustration of an intelligent network for a call between two terminals.

FIG. 3 depicts a schematic illustration of an intelligent network 300 for a call between two terminals T1,T2. The intelligent network 300 comprises switching servers SS-31, SS-32, a media gateway MGW-31, a network N1 on the side of terminal T1 and a network N2 on the side of terminal T2, a control entity CE-31, and a switching entity SE-31.

The switching entity SE-31 is collocated with the switching server SS-31 which is a preferred arrangement. To this end, the switching entity SE-31 may be a physical and/or logical sub-unit of the switching server SS-31. The switching entity SE-31 operating on the switching server SS-31 and the control entity CE-31 communicate via link L300.

Intelligent network architectures are conceivable wherein a switching server and a switching entity could be distant from each other such that a dedicated communication channel between the distant switching server and a distant switching entity may have to be arranged for communication between the switching server and the switching entity. If not otherwise specified, however, the switching server and the switching entity are assumed to be collocated on the same device with internal communication interfaces towards each other.

The intelligent network 300 of FIG. 3 depicts a bearer for a call being subjected to the control of by the control entity CE-31. An intelligent network subjection indicator may be used for indicating that the call shall be subjected to the control by the control entity CE-31. Alternatively or in addition, an entity in the intelligent network may be configured to automatically subject the call to the control by the control entity CE-31 and initiate the subjection accordingly. The bearer depicted in FIG. 3 comprises bearer segments B31, B32 that have been established according to an optimum forward bearer establishment procedure with only one media gateway MGW-31.

According to the invention, the control entity CE-31 is adapted to determine a bearer establishment procedure and to send an instruction for instructing the switching entity SE-31 to initiate establishing of the bearer as instructed. Hence, the switching entity SE-31 initiates the establishment of the bearer via the switching server SS-31, here depicted in an optimized manner with only one media gateway MGW-31 selected.

Figure 4:
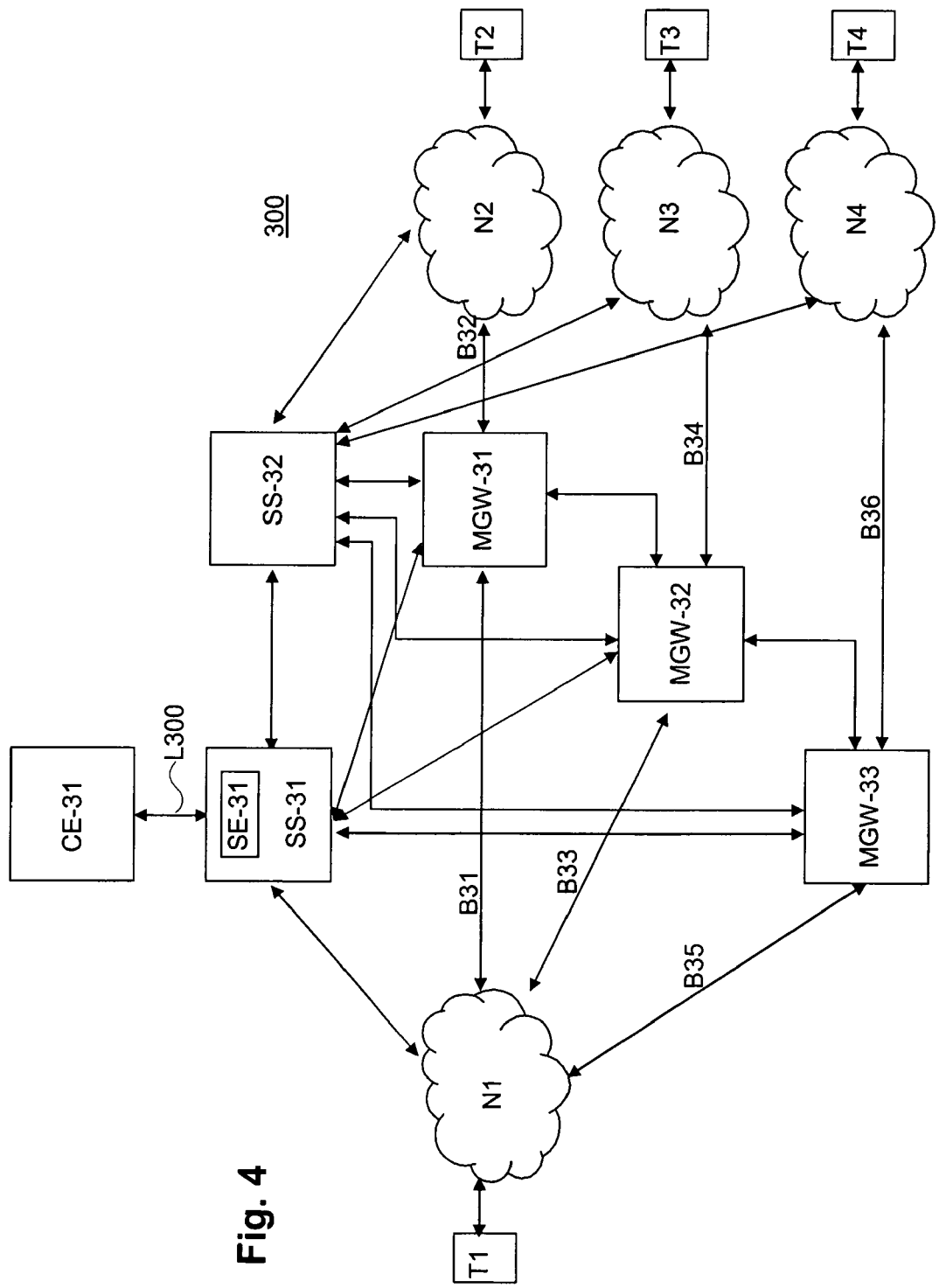
FIG. 4 shows a schematic illustration of an intelligent network for a multiparty call.

FIG. 4 depicts an illustration of the intelligent network 300 for a multiparty call involving terminals T1-T4. A call between terminals T1,T2 may be set-up with a bearer establishment procedure as described in conjunction with FIG. 3. The switching entity SE-31 may then report the successful bearer establishment between terminals T1,T2 to the control entity CE-31 via link 300. The control entity CE-31 may then determine for the call being a multiparty call to establish further bearers to involve further terminals T3,T4 into the multiparty call and accordingly sends out one or more instructions to the switching entity SE-31 via link L300 to initiate two further bearer establishments to involve terminals T3,T4 into the multiparty call. FIG. 4 depicts exemplary bearers which have been established for including terminal T3 via media gateway MGW-32, bearer segments B33, B34 and network N3 and terminal T4 via media gateway MGW-MGW-33, bearer segments B35,B36, and network N4.

It is apparent for the skilled person that the intelligent network 300 may be build up according to many more variations relating to e.g. choice, type or arrangement of nodes, bearer segments, networks, and/or terminals. The intelligent network 300 may be also a part of a larger network or may be attachable to one or more further networks, e.g. if at least one of the terminals is to be connected via the Internet while the control entity CE-31 and the switching entity SE-31 are located in a wireless intelligent network like a CAMEL IN.

Figure 5:
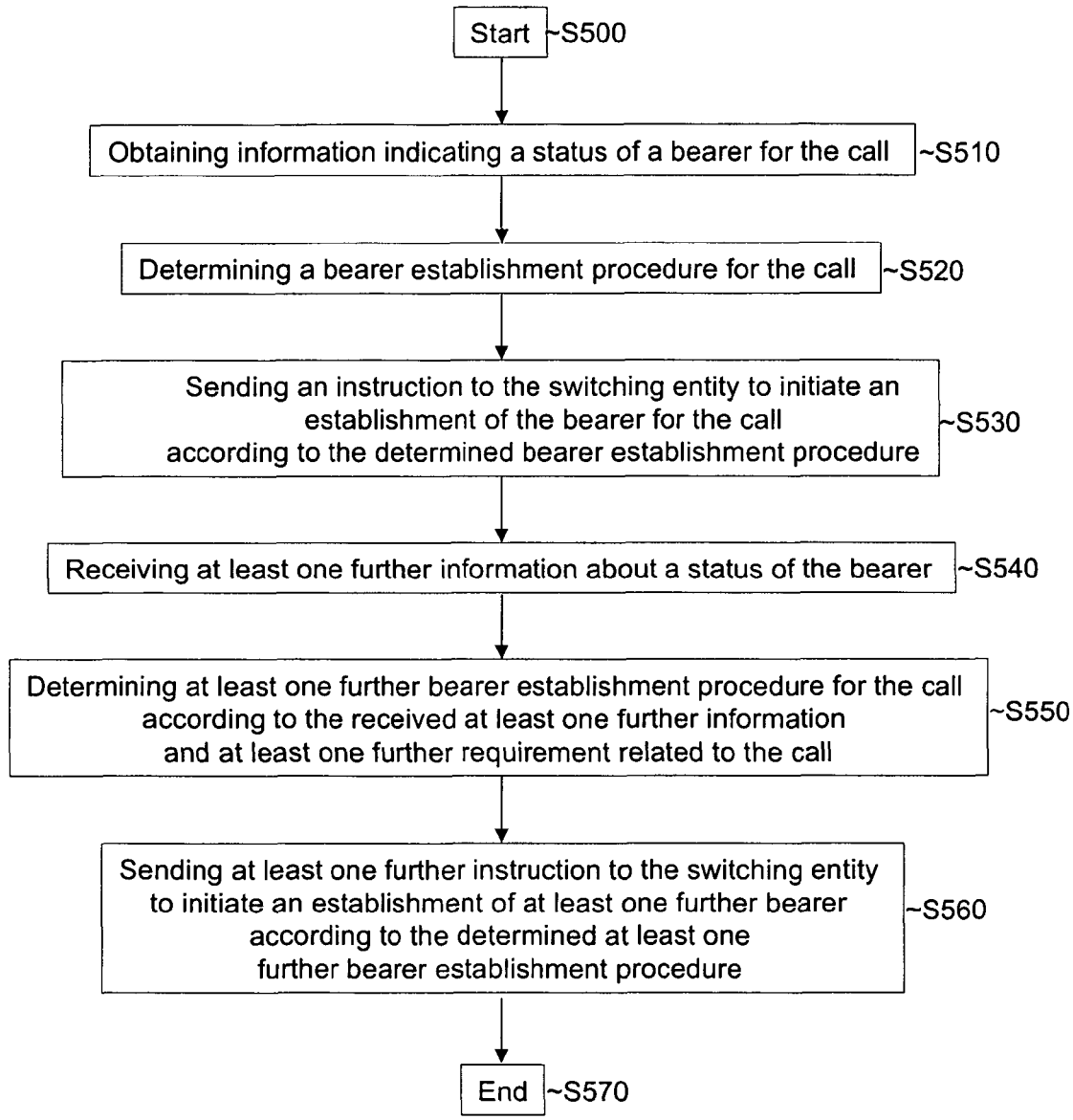
FIG. 5 shows a schematic flow diagram of method steps performed by a control entity.
Figure 6:
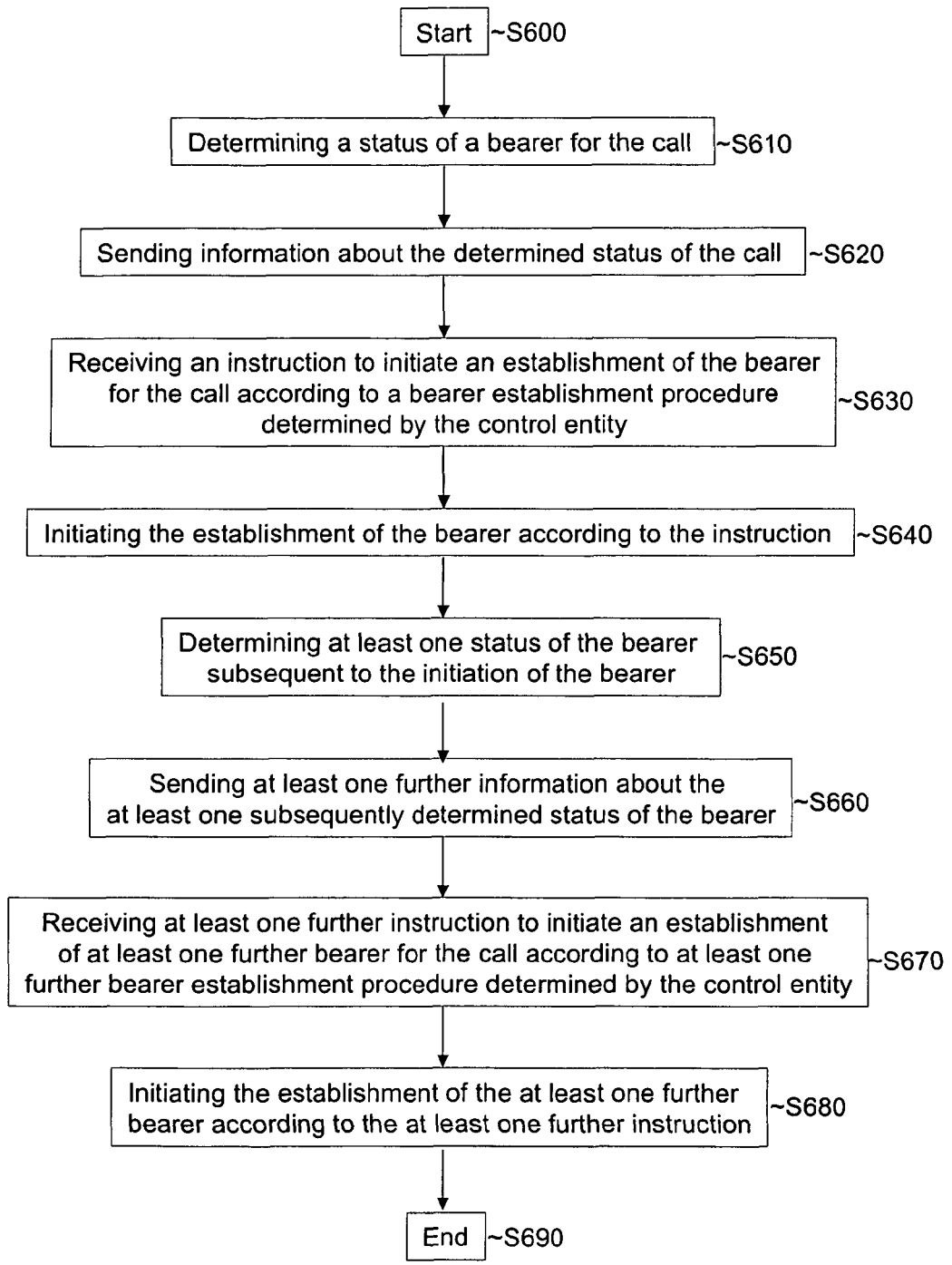
FIG. 6 shows a first schematic flow diagram of method steps performed by a switching entity.
Figure 7:
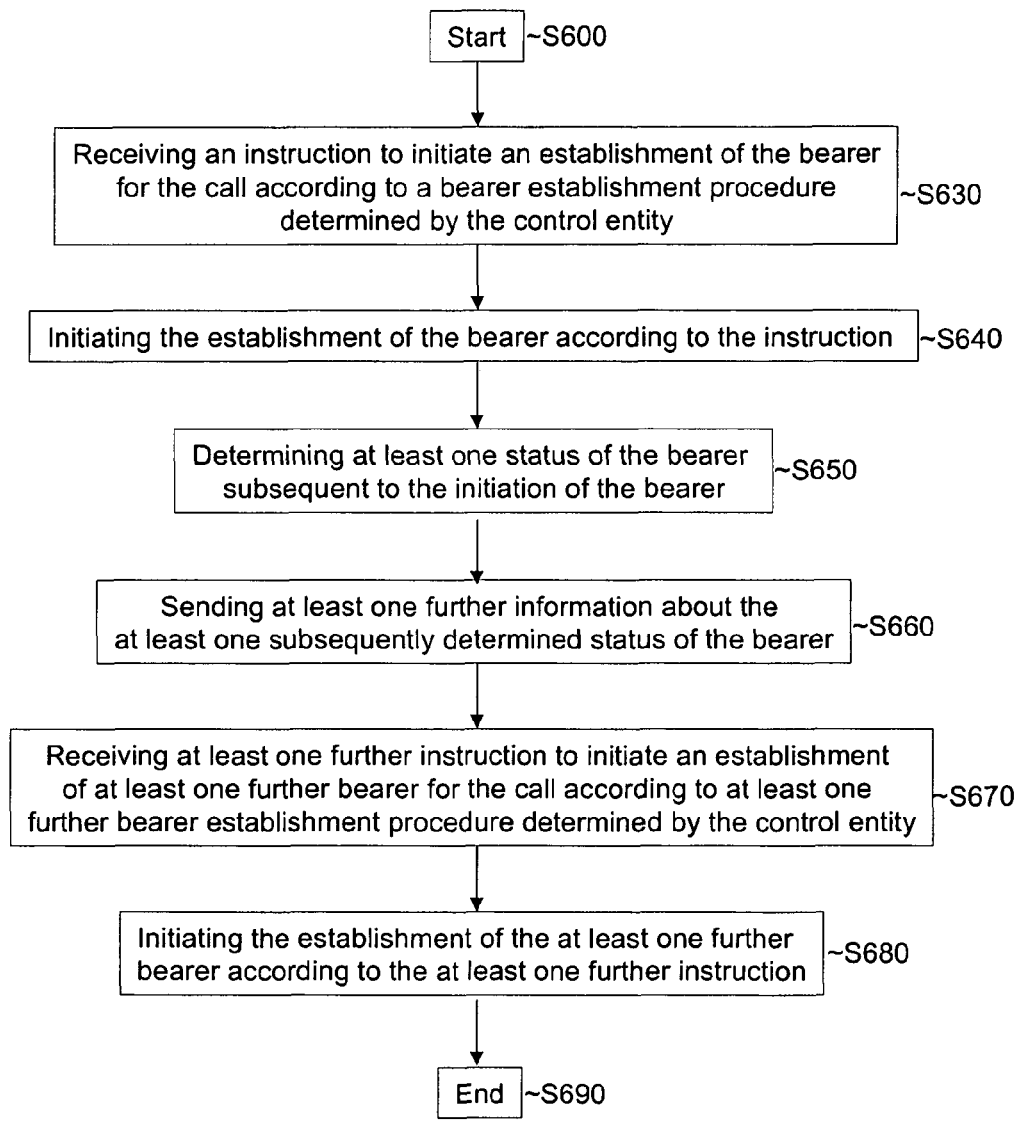
FIG. 7 shows a second schematic flow diagram of method steps performed by a switching entity.

A more detailed operation of a control entity and a switching entity may be illustrated with the help of FIGS. 5-7. It is referred for illustrative reasons to the control entity CE-31 and the switching entity SE-31.

The method according to FIG. 5 may start S500 by a reception of an initial message indicating a status of a bearer for a call or may be triggered by an initiation of a call by the control entity CE-31 itself. The control entity CE-31 performs the step of obtaining S510 of information indicating a status of a bearer for the call. Said information may be obtained from the initial message, e.g. by extracting data relating to said information from said message, or if the call is initiated by the control entity CE-31, from the fact that at the initial time of call initiation by the control entity CE-31 no bearer at all is typically set-up for this control entity CE-31 initiated call.

The method may proceed further to step S520 wherein a bearer establishment procedure for the call by the control entity CE-31 is determined. Logic of the control entity CE-31 may analyze the obtained information indicating the status of the bearer and at least one requirement related to the call.

A call-related requirement may be obtained from information provided by the switching entity to the control entity. Alternatively or in addition, a call-related requirement may be obtained by the control entity, e.g. when the call is initiated by the control entity.

The (intelligent) control entity CE-31 may have extended knowledge regarding network topology and/or load of network entities and may consider this information as further requirement for the determination of bearer establishment procedure. In this regard, the control entity CE-31 may be adapted to determine a preferred MGW and/or codec to be used for the call for improved call-set up, costs, and/or call quality, e.g. usage of a preferred MGW may be instructed to the switching entity in case some MGWs are overloaded or calling parties are easily connectable to said preferred MGW.

According to step S530, an instruction is sent from the control entity CE-31 to the switching entity SE-31 to initiate an establishment of the bearer for the call according to the determined bearer establishment procedure. The method may end at this step or may proceed further to step S540.

The control entity CE-31 may be notified about a result of the bearer establishment procedure. For this reason it may perform the step of receiving S540 a further information about a status of the bearer. The further information may report "bearer successfully established" or "bearer establishment procedure executed as instructed" or the like. Based on the received information, the control entity CE-31 may decide to end the method already at this point in time, e.g. because the establishment of the bearer according to the determined procedure was successful. If the establishment procedure failed, the control entity CE-31 may decide to proceed to steps S550 and S560 and to try out the same bearer establishment procedure again or to select an alternative bearer establishment procedure in view of the previously failed procedure and to instruct the switching entity accordingly.

If the first bearer establishment procedure was successfully reported to the control entity CE-31, the control entity CE-31 may decide to include further parties into the call. It may thus determine according to step S550 at least one further bearer establishment procedure for the call according to the received at least one further information (e.g. notification on successful bearer establishment) and at least one further requirement related to the call (e.g. call being a multiparty call). Subsequently, the control entity CE-31 may initiate a sending S560 of at least one further instruction to the switching entity SE-31 to initiate an establishment of at least one further bearer according to the determined at least one further bearer establishment procedure.

The method may end S570 here or may be continued, e.g. to include further participants into the call or to find alternatives for failed bearer establishment procedures as described above.

The switching entity SE-31 may be operated according to the steps depicted in FIG. 6. The method may start S600 with a reception of a request for call-set up at the switching entity SE-31 indicating that the call is to be subjected to the control of a controlling entity. The switching entity SE-31 may then perform the step of determining S610 a status of a bearer for the call. Information about the determined status is sent according to subsequent step S620 to the controlling entity CE-31, e.g. for indicating that no bearer has been selected or to indicate a pre-configured bearer establishment procedure to the control entity CE-31 or the like.

Subsequently, the switching entity SE-31 performs the step of receiving S630 an instruction to initiate an establishment of a bearer for the call according to a bearer establishment procedure as determined by the control entity CE-31. The instruction may indicate a particular bearer establishment procedure that must be followed by the switching entity SE-31, e.g. a forward or backward bearer establishment procedure. Any bearer establishment procedure that may be pre-configured at the switching entity SE-31 is thus overruled by the instruction.

The switching entity SE-31 initiates S640 the establishment of the bearer as instructed. The method may end with this step S640. Alternatively, the switching entity SE-31 may perform the step of determining S650 at least one status of the bearer subsequent to the initiation of the bearer and sends S660 at least one further information about the at least one subsequently determined status of the bearer to the control entity CE-31.

Especially for a multiparty call or in case the previous bearer was not successfully established as described in conjunction with FIG. 5, the switching entity SE-31 may receive S670 at least one further instruction to initiate an establishment of at least one further bearer for the call according to at least one further bearer establishment procedure as determined by the control entity CE-31. The switching entity follows the at least one instruction received in step 670 and initiates S680 the establishment of the at least one further bearer accordingly.

The method may end S690 here or may be continued, e.g. to include further participants into the call or to find alternatives for failed bearer establishment procedures as described above.

FIG. 7 depicts a second flow diagram of method steps S600, S630-S690 that may be executed by a switching entity CE-31 in case a call is initiated by the control entity CE-31.

The invention may be implemented in various types and versions of an intelligent network comprising a control entity and a switching entity. In the following FIGS. 8-12 various embodiments for implementing the invention in an intelligent network according to the CAMEL standard are described. However, these examples are illustrative and not meant to exclude applicability of the invention to further intelligent networks like e.g. INAP or AIN.

Common to all FIGS. 8-12 are
- a control entity, denoted by SCP (Service Control Point). A SCP is also known as gsmSCF (CAMEL Service Control Function) for CAMEL IN.
- a switching entity, denoted by SSF (Service Switching Function). The SSF is also known as gsmSSF (CAMEL Service Switching Function) for CAMEL IN. The gsmSSF is typically a logical sub-unit of an MSC or MSC-server.
- a switching server, denoted by MSCNLR,
- one or more terminals denoted by Ue-A . . . Ue-E, and that the switching entity SSF and the switching server MSV/VLR are collocated on a switching server SS-C.

FIGS. 8-12 focus on the actions and interactions of the switching entity (combined with the switching server) and the control entity. Interactions with further network resources and terminals are indicated by messages from and towards the respective terminals Ue-A . . . Ue-E. For the reason of simplifying the illustration and explanation, further network components like MGWs or established bearers are not depicted in FIGS. 8-12.

FIGS. 8-12 make use of the terminology of a bearer selection referring to both MGW and codec selection procedures. A selected bearer may be synonymous to an established bearer in view of the alternatively used terminology of forward bearer set-up (deferred MGW selection) and backward bearer set-up (non-deferred MGW selection or immediate MGW selection) whereas the term bearer set-up is to be used in an equivalent manner as bearer establishment. In the following, no differentiation between a bearer establishment procedure or a bearer selection procedure on the one hand and between an established bearer and a selected bearer on the other hand will be made.

IN protocols like INAP and CAP (e.g. CAPv4, see 3GPP TS 29.078 and 3GPP TS 23.078) are preferably amended by at least one of the following detailed enhancements to provide a switching entity and a control entity with the capabilities according to the invention:

a) A new "Bearer Selection Status Indicator" information element (IE) may be added to the Initial Detection Point (InitialDP or IDP in short) operation for indicating a bearer status:

| Information Element name | Description |
| --- | --- |
| Bearer Selection Status Indicator | This IE indicates whether the bearer (MGW and/or codec) has been selected or not. |

The above IE is preferably mandatory.

b) The operations "Connect" (CON) or "ContinueWithArgument" (CwA) may be used to carry information regarding the instruction for the bearer establishment procedure to be followed by the switching entity. Forward bearer setup leading to an optimal MGW selection for some call scenarios may be implicitly instructed.

c) A new Event Type "O-Bearer_Selected" and "T-Bearer_Selected" may be added in the Event Report Basic Call State Model (ER BCSM or ERB in short) operation to specify a Bearer Selected event during the call set-up.

| Information element name | Description |
| --- | --- |
| Event Type BCSM | This IE specifies the type of event that is reported. |

If the Event Type BCSM IE contains either T_Bearer_Selected or O_Bearer_Selected, then the Event Specific Information BCSM IE may contain the following information element:

| Information element name | Description |
| --- | --- |
| Bearer Selected | This IE is used to indicate bearer selected event | d) The new event type O-Bearer_Selected or T-Bearer_Selected may be added in the Request Report BCSM operation to arm the new EDPs at point c) above

| Information element name | Description |
| --- | --- |
| Event type | IE specifies the type of event for which a report is requested. | e) A new operation "Select Bearer" may be added for instructing the switching entity to select a bearer and to notify the control entity. If the bearer is successfully selected, a positive operation result will be returned to SCP.

f) User interaction procedures ("ConnectToResource" and "Establish Temporary Connection" operations) may be used to implicitly instruct to perform backward bearer setup (immediate MGW selection on the incoming side). Once a bearer is selected, the SSF may be allowed to send/receive in-band information. The MGW selected by the incoming side will be provided as MGW selection information to the terminating exchange. In addition the terminating exchange may select another MGW On top of this protocol enhancements, when a call is routed to the SSF, any pre-configured bearer establishment procedures like a short-cut solution as the automatic backward bearer selection prior to sending InitialDP may be disabled. e.g. removed completely or suspended, at least until the reception of the instruction regarding the bearer establishment procedure that is to be used by the SSF (and hence overwrites any pre-configured bearer establishment procedures).

On the right hand side of each of the FIGS. 8-12, a bar is shown. The bar is subdivided into numbered segments. Each numbered segment represents a phase of the call set-up phase covering one or more messages between entities and/or one or more processes performed at the respective entities. The phases have been introduced for illustrative and explanatory purposes only and are not meant to limit the scope of the invention. Especially, it is neither intended to suggest that the call set-up procedure has be structured according to these phases nor that from the length of a bar segment it can be concluded to the time needed for exchanging the depicted messages and/or carrying out the described processes of a particular phase.

Figure 8:
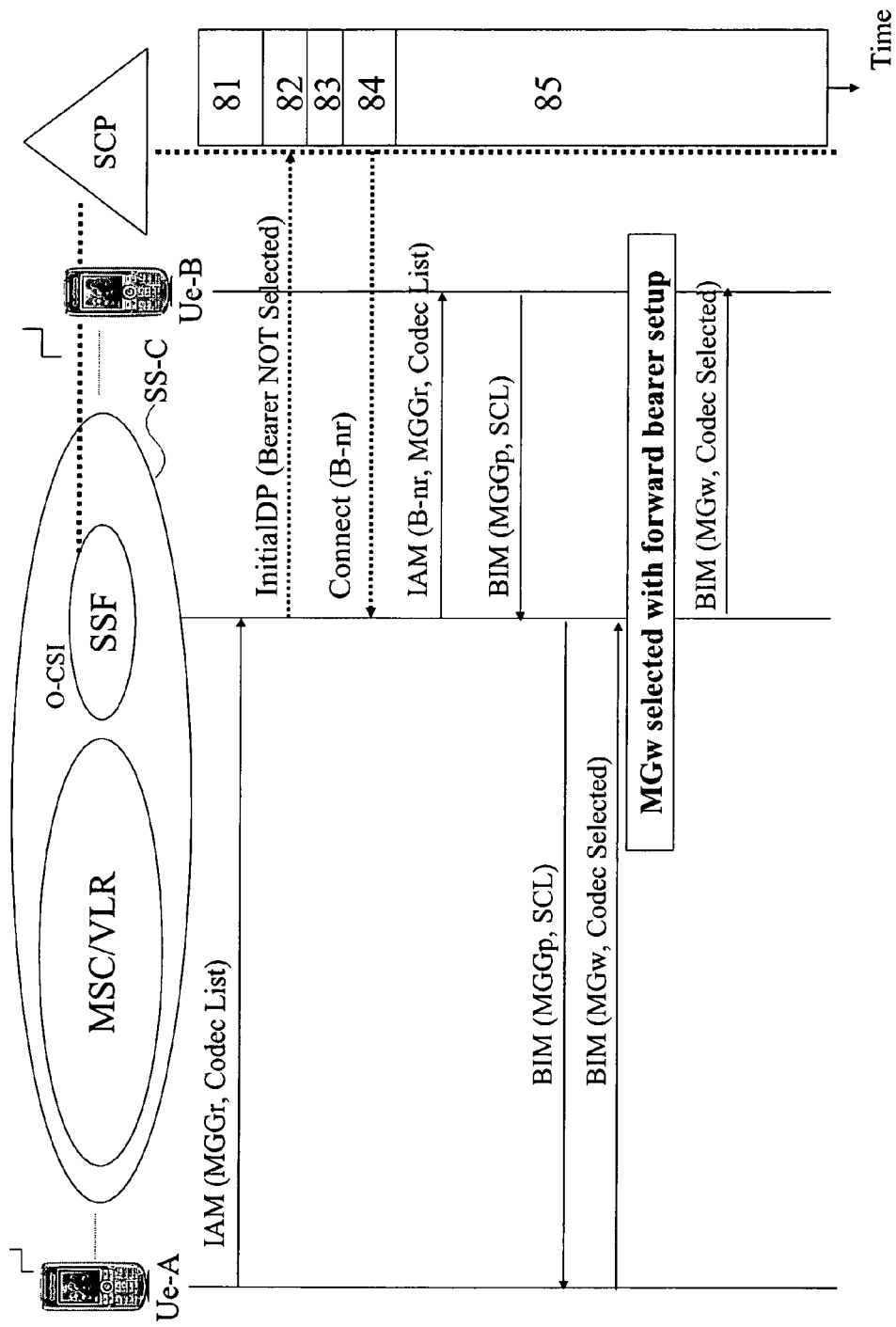
FIG. 8 schematically shows an embodiment of the invention for a mobile originating call and forward bearer selection without notification.

FIG. 8 illustrates phases 81-86 of a call set-up procedure for a call to terminal Ue-B originating from terminal Ue-A.

According to phase 81, the MSCNLR receives an originating mobile call with Originating CAMEL subscription information (O-CSI). The set-up Initial Address Message (IAM) contains information concerning the Media Gateway Selection and Codec List. Due to CAMEL subscription the MSCNLR instantiates a SSF process, in other words it invokes the switching entity. In case the MSCNLR has pre-configured an automatic backward bearer set-up procedure (which would result in an inferior bearer establishment with non-optimal MGW selection as described in the background section), the automatic bearer set-up procedure is not followed. Instead, it is determined that no bearer has been selected yet for the call.

Hence, according to phase 82, the SSF sends CAP Initial DP (IDP) to the SCP indicating that a bearer is not selected. Preferably, the IDP message comprises a dedicated information element according to a) above for said indication.

According to phase 83, the SCP extracts the status information indicating that a bearer has not been selected yet from the received IDP message and feeds the status information into its logic for determining a bearer establishment procedure for this call being a terminal originated two-terminal call. With these parameters as input to its logic, the SCP may determine that a forward bearer establishment procedure can be performed preferably.

According to phase 84, the SCP returns call control to the SSF via a relevant CAP operation (CON or CwA) to continue call establishment towards the final destination, i.e. terminal Ue-B with number B-nr. The SCP may include an explicit instruction about the determined bearer establishment procedure. However, in case an optimum bearer establishment procedure with only one MGW is chosen by the SCP for the call, the SCP and SSF may be configured for an implicit instruction exchange, i.e. if the relevant message (CON or CwA) does not comprise any explicit instruction about the determined bearer establishment procedure, the SSF knows that after invocation of the SCF with the IDP message according to 82, it has to follow optimum bearer establishment procedure when receiving CON or CwA message except if it would be explicitly instructed according to an instruction message comprising an explicit instruction.

According to phase 85, the SSF initiates the bearer establishment procedure as instructed, i.e. a forward bearer establishment procedure. The call setup proceeds with MGW information and Codec List sent towards the final destination on the side of terminal Ue-B. From the final destination a Bearer Independent Message (BIM) backwards message is received with Media Gateway Group (MGGp) and Supported Codec List (SCL). This message is sent towards the calling subscriber. The Media Gateway and codec list is selected by the incoming side and this information is sent in a forward BIM message to the SSF. Now, the MGW (and the codec) is selected with forward bearer set-up as indicated. MGW and Codec Selected information received from the incoming side is forwarded by a BIM message to the final destination.

The call set-up procedure according to FIG. 8 lacks an explicit notification about a result of the determined bearer establishment procedure initiated accordingly by the SSF. As for the previously described implicit indication of the bearer status, the SSF and the SCP may be configured in a way that for certain call types an explicit notification is not needed when the bearer has been successfully established as instructed, thus saving at least one message and by thus decreasing processing load at the SSF and SCP as well as load on the interface between SSF and SCP.

However, for certain events like for cases when the bearer establishment fails and/or for certain call types like a multi-party call, an explicit notification may be beneficial. Alternatively, a notification may be sent by default for any call.

Figure 9A:
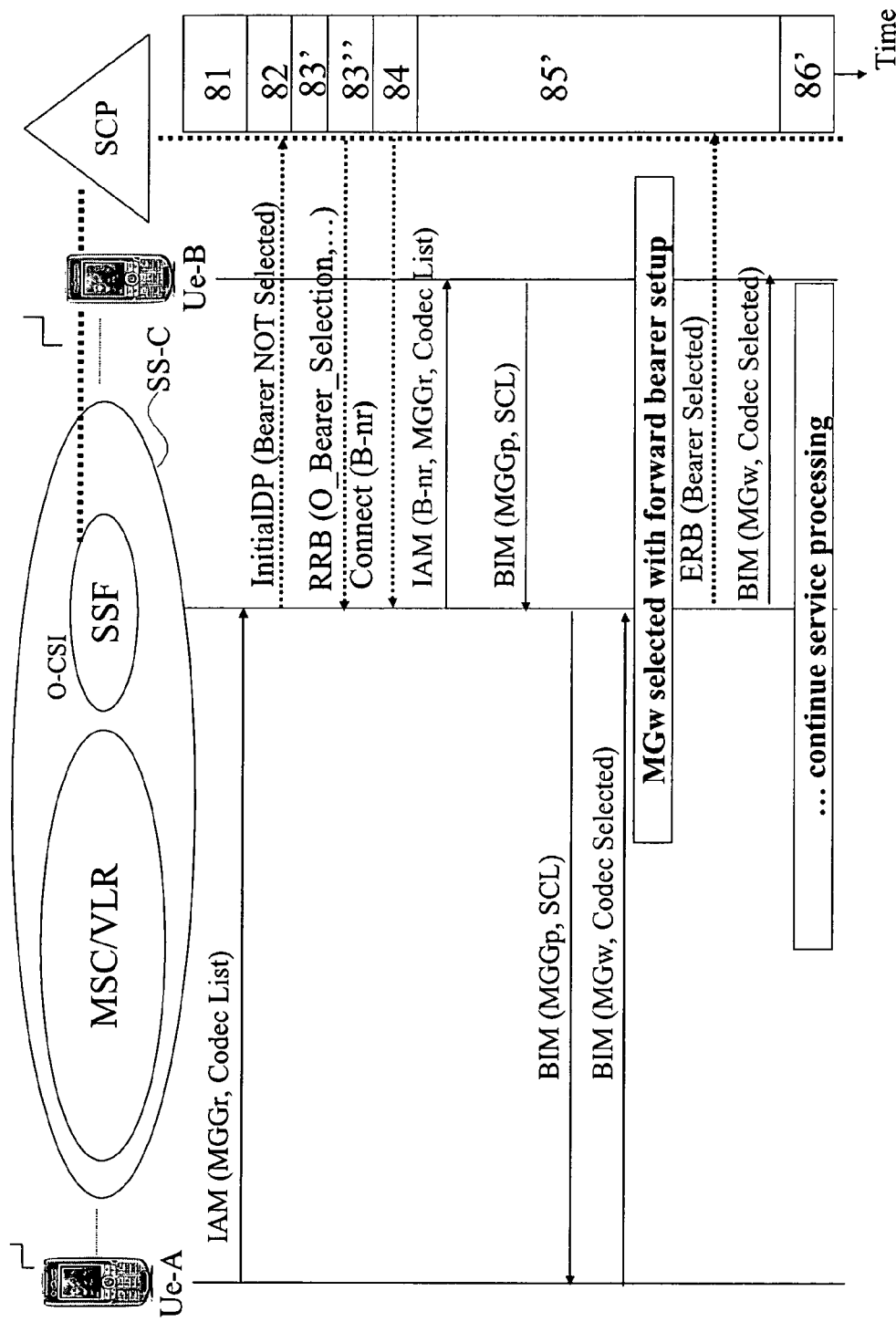
FIG. 9*a* schematically shows an embodiment of the invention for a mobile originating call and forward bearer selection with notification.
Figure 9B:
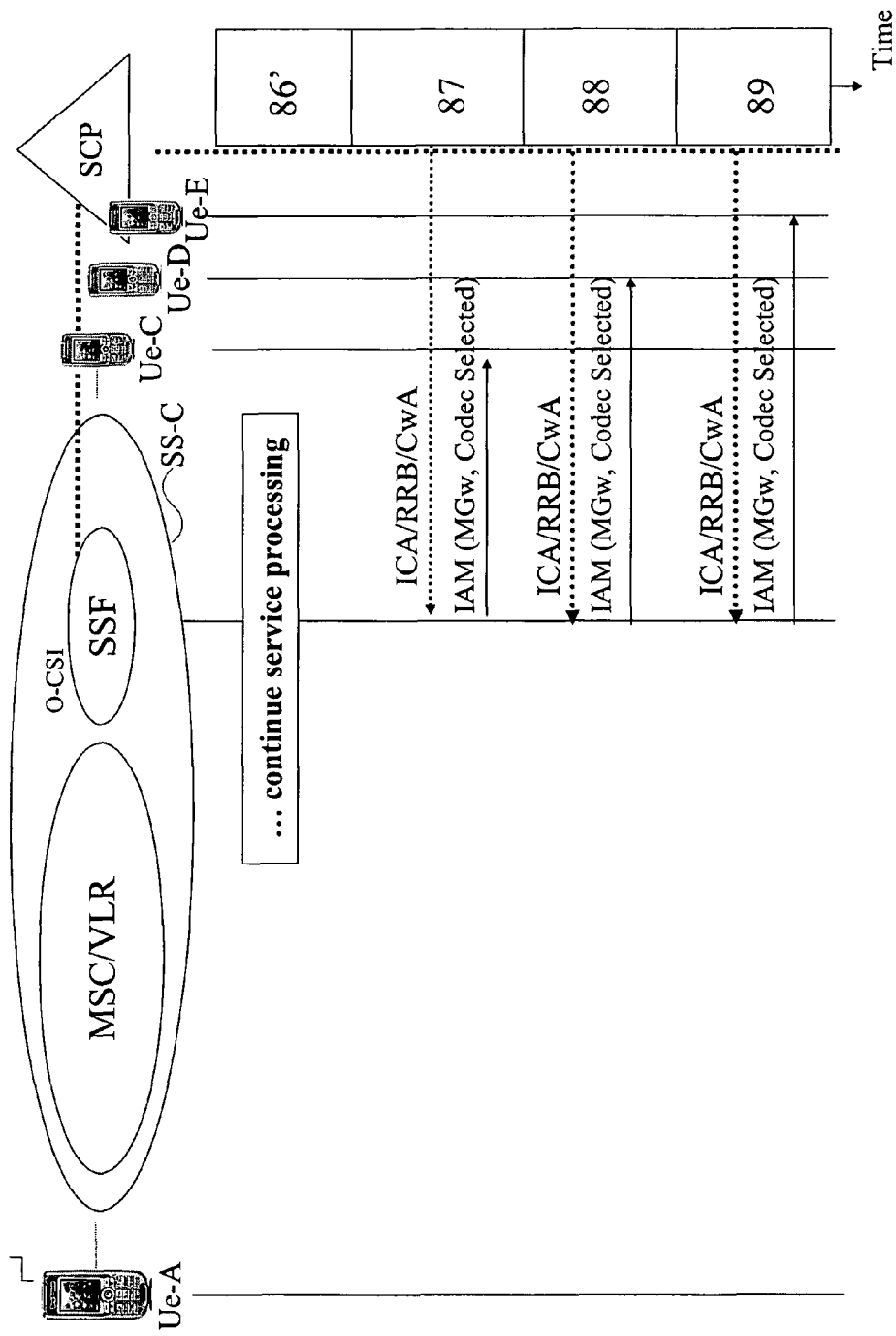
FIG. 9*b* shows an extension of FIG. 9*a* for the call being a multiparty call.

FIGS. 9a and 9b depict a call set-up procedure similar to FIG. 8. Identical numbers represent phases with messages and operations being carried out in a similar manner as described in conjunction with FIG. 8 and it is referred to their description. For the phases 83', 83",85',86',87-89 the following applies.

According to phase 83', the SCP, respectively its logic, in contrast to phase 83, determines it needs a notification about a result of the bearer establishment procedure, e.g. because the call is indicated as a multiparty call and/or for statistical reasons or charging purposes.

According to phase 83", the SCP instructs the SSF to send a notification about a result of the bearer establishment by sending a RRB message indicating O_Bearer Selection.

According to phase 85', the SSF proceeds in a similar manner as described in conjunction with phase 85 for FIG. 8 In addition, it sends an indication about a result of the forward bearer establishment procedure. For the indication, ERB operation with "Bearer Selected" information is send to indicate that a bearer according to the instructed bearer establishment procedure (here optimum bearer establishment procedure) has been established for the call between terminals Ue-A and Ue-B.

According to phase 86', the SCP being notified about the successful bearer establishment according to its instruction, further determines for this call being a multiparty call, that further call legs with a bearer establishment to further terminals Ue-C . . . Ue-E have to be established.

The SCP thus further proceeds to phases 87-89 depicted in FIG. 9b showing the establishment of the further call legs for including participants Ue-C . . . Ue-E. The first outgoing leg to terminal Ue-B may be still present in the multiparty call, however, Ue-B is not depicted in FIG. 9b focusing on the inclusion of further participants represented by terminals Ue-C . . . Ue-E.

Referring back to phase 86', the SCP is thus notified about the successful bearer establishment procedure as instructed, i.e. about the fact that the bearer has been selected in an optimal way after the creation of the first outgoing leg according to the flow in FIG. 9a. Accordingly, the SCP determines that it is now the right timing to initiate multiple call leg creation in parallel.

87,88,89 The SCP may send out multiple Initial Call Attempt (ICA), RRB, and CwA messages for instructing the SSF to perform multiple further bearer establishment procedures relating to the establishment of multiple call legs to terminals Ue-C . . . Ue-E. As optimum bearer has been already selected according to phase 85', the legs established according to phases 87-89 may use the same bearer.

Figure 10:
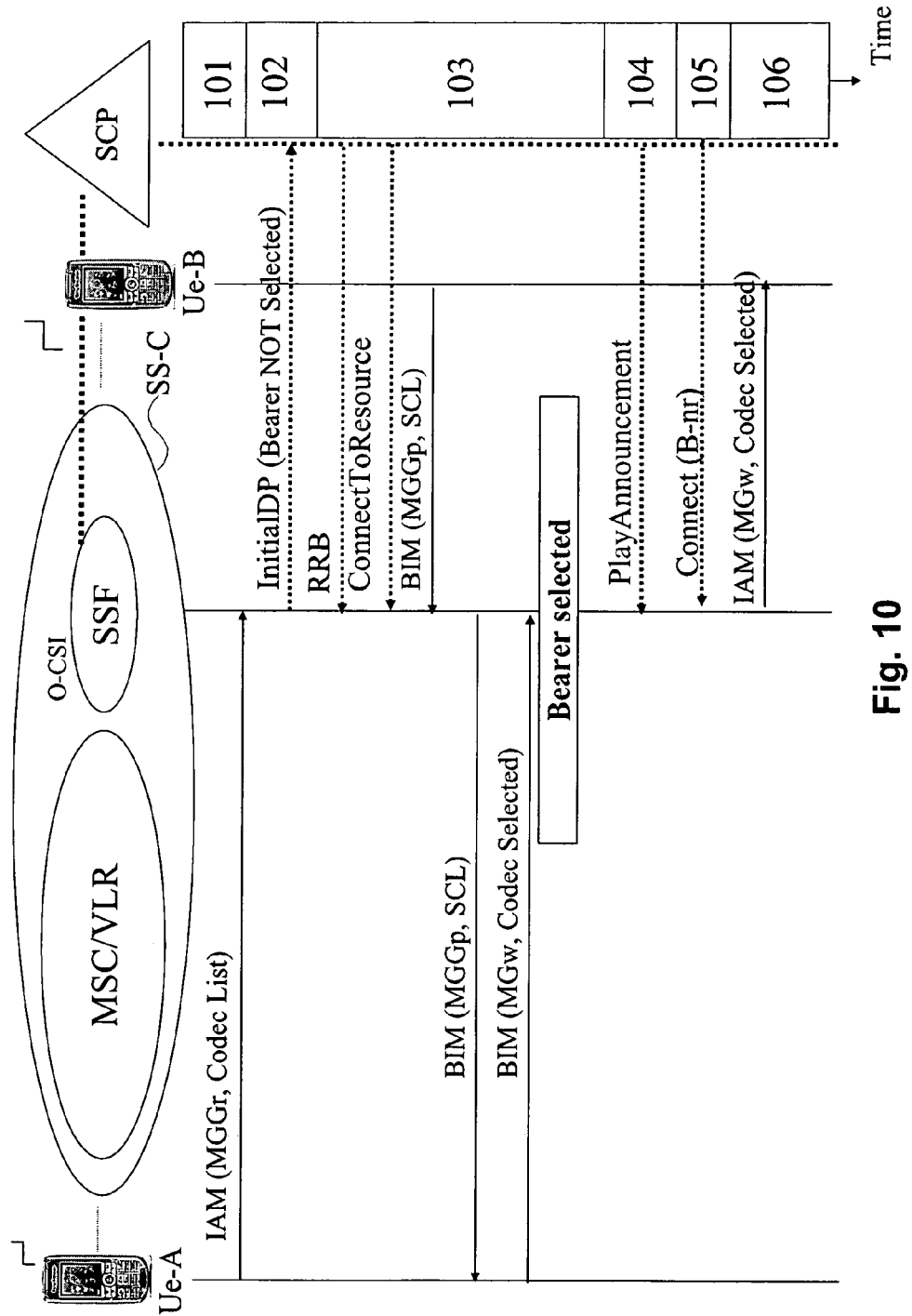
FIG. 10 schematically shows a first embodiment of the invention for a mobile originating call and backward bearer selection with notification.

FIG. 10 illustrates an example for a call set-up wherein backward bearer set-up has been determined because a user interaction is required.

According to phase 101, the MSCNLR receives an originating mobile call with O-CSI and according to phase 102, the SSF sends an IDP message indicating that a bearer has not been selected as described in conjunction with phases 81 and 82, respectively.

According to phase 103, the SCP determines based on its service logic to initiate a user interaction as an example for an intelligent network service that might be provided in addition to the call set-up. This call-related requirement is inputted into the logic as well as the received bearer status information to determine that a backward bearer establishment procedure is required to be executed, because the bearer to terminal Ue-A is needed to send e.g. in-band information. The SCP may implicitly instruct the SSF to follow the determined backward bearer establishment procedure via ConnectToResource (CTR) message. Alternatively, this instruction may be sent explicitly. A RRB message might be used to indicate that a notification about the result of the bearer establishment procedures is needed.

Accordingly, from SSF a BIM backward message may be sent with request to select any MGW and codec at the incoming side. The Media Gateway and codec list is selected by the incoming side and this information is sent in a forward BIM message to the SSF resulting in the selection of the bearer.

At a reception of a result of the CTR instruction operation, the SCP may store the indication that a bearer is selected (not shown in FIG. 10) and may further use this information for a parallel leg establishment procedure (not shown) for a multiparty call.

An Address Complete Message (ACM) message may be sent towards terminal Ue-A. By the ACM message so-called "in-band information follow" indication can be sent to terminal Ue-A for informing that an announcement will be played later.

According to phase 104, a Specialized Resource Function (SRF) (not shown in FIG. 10) may be used to play an announcement or for sending a tone. The SCP being notified in phase 103 about the bearer establishment status may start to play an announcement with PlayAnnouncement operation. Accordingly, the announcement to the user of terminal Ue-A can be played out using further messages (not shown in FIG. 10) known to the person skilled in the art.

Once the announcement is played, the SCP returns the call control to SSF via the relevant CAP operation (Connect or Continue With Argument) to continue call establishment towards the final destination with number B-nr according to phase 105.

According to phase 106, the call setup proceeds with MGW information and Codec already selected being sent towards the final destination of terminal Ue-B.

Figure 11A:
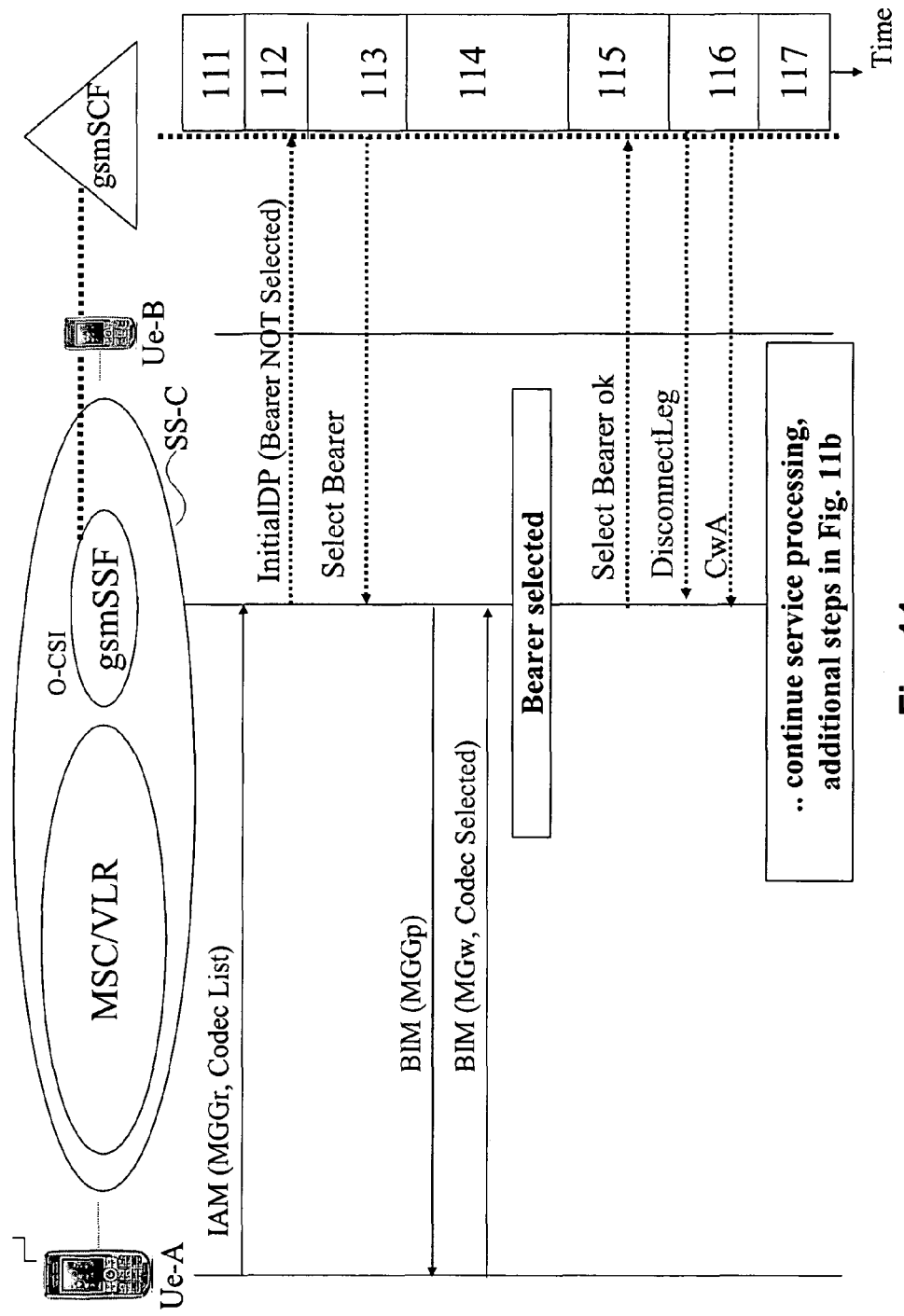
FIG. 11*a* schematically shows a second embodiment of the invention for a mobile originating call and backward bearer selection with notification.
Figure 11B:
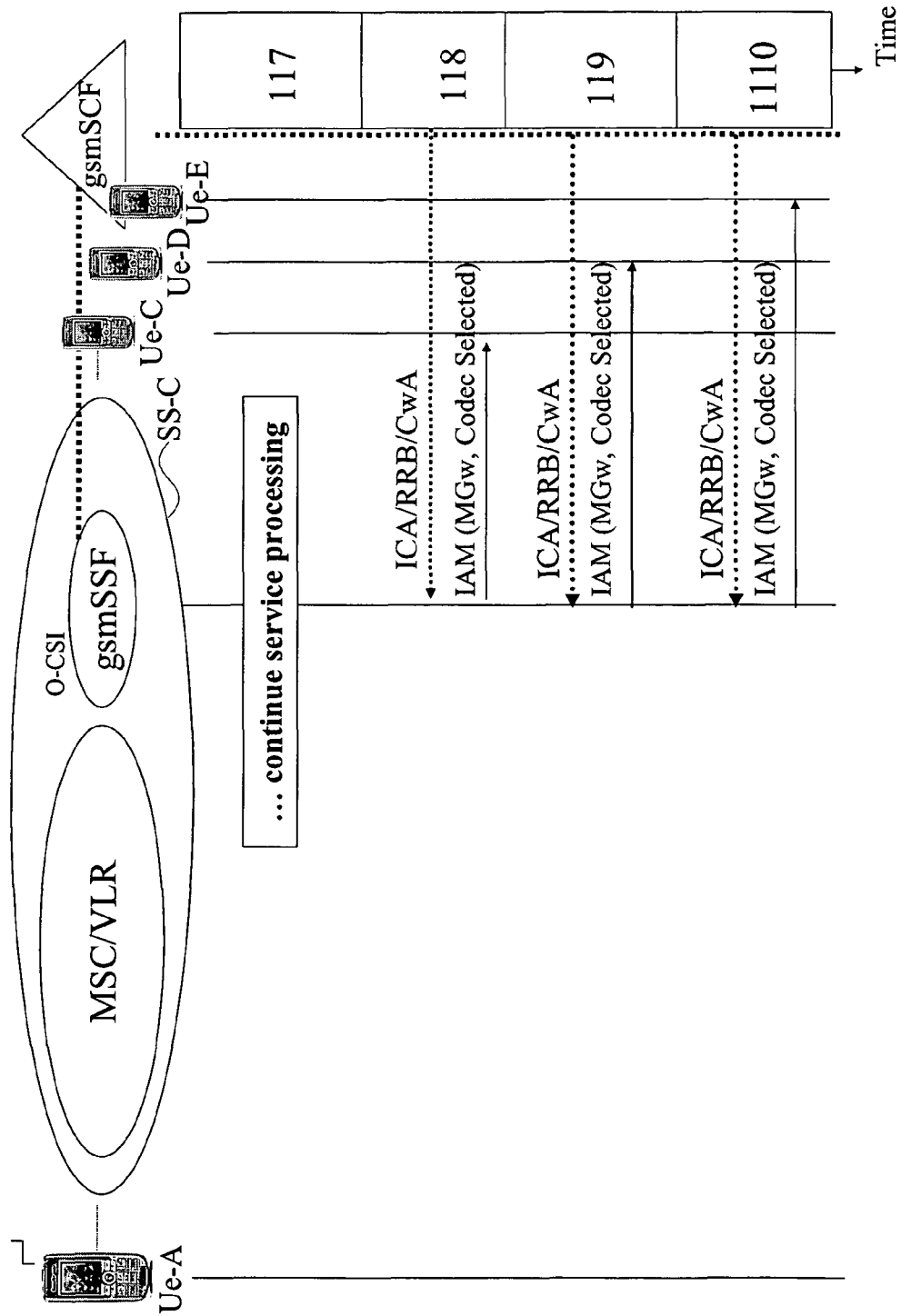
FIG. 11*b* shows an extension of FIG. 11*a* for the call being a multiparty call.

FIG. 11a and 11b illustrate a call-set up scenario wherein a backward bearer establishment procedure is ordered by the SCP before multiple call legs for a multiparty call are created.

According to phase 111, the MSCNLR receives an originating mobile call with O-CSI and according to phase 112, the SSF sends an IDP message indicating that a bearer has not been selected as described in conjunction with phases 81 and 82, respectively. Furthermore, after reception of the IAM message in phase 111, a default IAM message for the B-destination at terminal Ue-B may be generated at the gsmSSF.

According to phase 113, the gsmSCF determines based on its logic that a backward bearer establishment procedure and that a notification about the bearer establishment is needed for the multiparty call and sends out an instruction message "Select Bearer" for instructing the gsmSSF to initiate a backward bearer establishment procedure with notification.

According to phase 114, from the gsmSSF, BIM backward message is sent with request to select any MGW and codec at the incoming side. The MGW and codec list is selected by the incoming side and this information is sent to the gsmSSF in a forward BIM message resulting in a bearer status "bearer selected" as determined by the gsmSSF.

According to phase 115, the gsmSSF reports to the gsmSCF that the bearer has been successfully selected. The SCP may store the indication that the bearer is selected.

If e.g. a CAP v4 protocol is used, it may be necessary for the gsmSCF to suppress the sending of the previously generated IAM message towards the original B-destination. The disconnection of the leg to terminal Ue-B can be initiated from the gsmSCF at the gsmSSF by the sequence of messages DisconnectLeg and CwA as shown in phase 116. For other protocols, terminal Ue-B may not need to be disconnected and the SCF may instruct the SSF with Continue CUE operation to send out the IAM message or with CwA or CON operation in modified manner.

According to phase 117, the gsmSSF, triggered by the notification of the successfully determined bearer, decides by its logic to initiate further calling legs towards further destinations Ue-C. Ue-E. The gsmSCF may decide to use the same bearer for the subsequent legs to the further terminals Ue-C . . . Ue-E and initiates a sequence of instruction messages to the gsmSSF as depicted for phases 118-1110. Terminal Ue-B may be included into the multi-party call, if necessary, with a same sequence of instruction messages ICA/RRB/CwA from gsmSCF to gsmSSF and IAM (MGw,Codec Selected) from gsmSSF towards terminal Ue-B (messages not depicted in FIG. 11b).

According to phases 118-1110, the call set-up to the C/D/E-subscriber (Ue-C/D/E) is initiated by the gsmSSF after reception of the sequences ICA/RRB/CwA as depicted.

Figure 12:
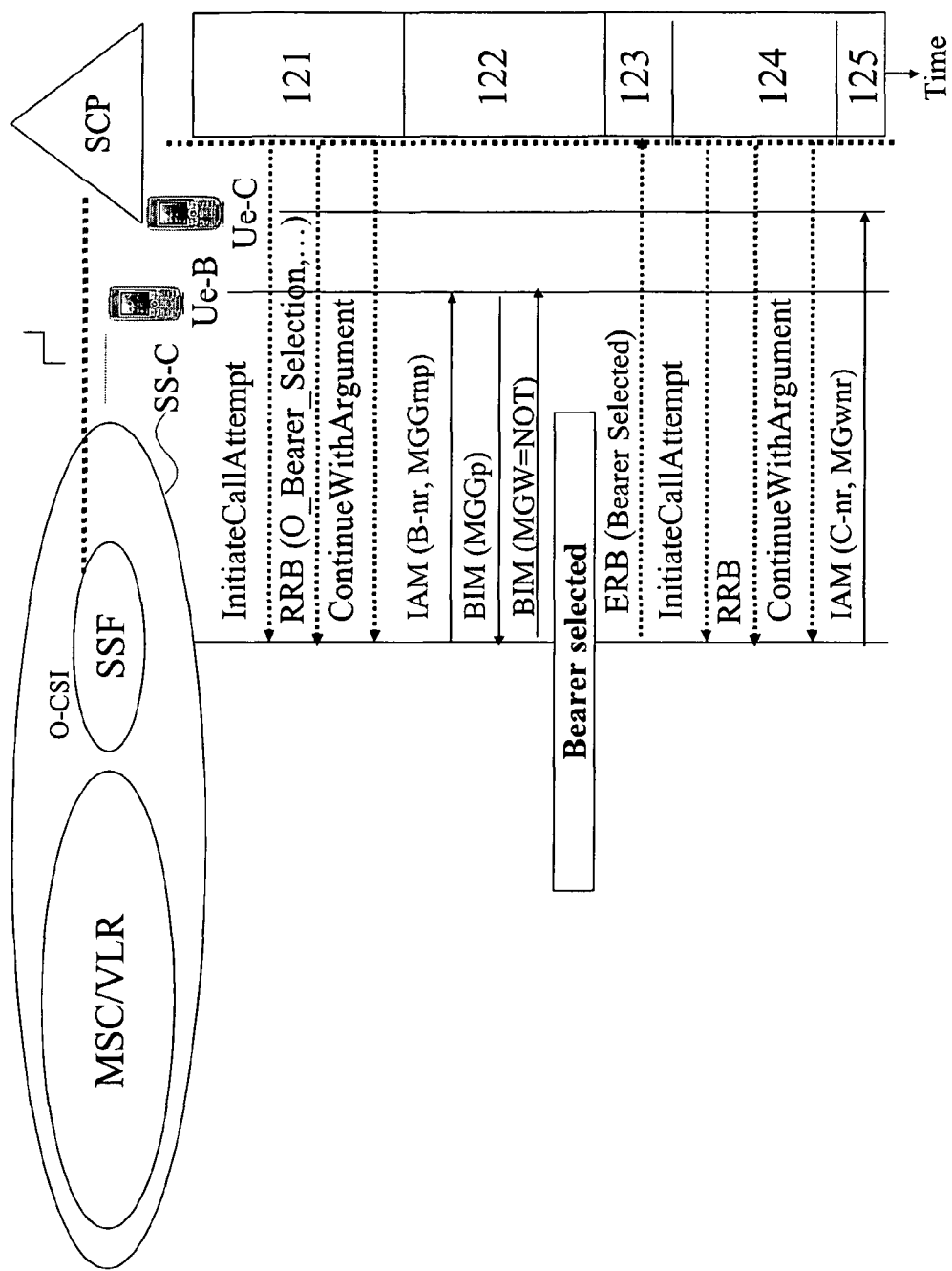
FIG. 12 schematically shows an embodiment of the invention for a control entity originating call towards multiple terminals and backward bearer selection with notification.

FIG. 12 depicts a call set-up procedure for a call being initiated by the SCP.

According to phase 121, the SCP starts a call with a sequence ICA, RRB, and CwA. As the call is initiated by the SCP, no bearer has been established yet. Bearer_selection event is armed in RRB because the SCP is going to instruct the SSF to initiate a new outgoing leg in parallel as an example for a bearer establishment procedure determined by the SCP for a SCP initiated call. Accordingly, the SCP sends an RRB instruction message to the SSF. The RRB message comprises the new "O_Bearer_Selected" event type. IAM is sent for requiring from the outgoing side the MGW information.

According to phase 122, the SSF receives the Media Gateway Group (MGG) and answers in BIM with MGW=NOT leading to the outgoing side to select the MGW as depicted.

According to phase 123, the ERB bearer selection event is reported to the SCP, i.e. the SCP is informed about the status of the bearer being selected.

According to phase 124, the SCP determines that a bearer has been selected and determines that the same bearer can be also used for the outgoing leg to terminal Ue-C. Accordingly, the SCP starts a new call leg towards a new destination with sequence ICA, RRB, and CwA.

According to phase 125, the SSF sends outgoing IAM indicating MGW selection not required since it was already selected.

The examples described in conjunction with FIG. 8-12 illustrate the wide applicability of the invention to O-CSI. However, the invention is also applicable in a same manner to call provided with Terminating (T-)CSI, Dialed Service (D-) CSI, Network (N-)CSI, or VMSC Terminating (VT-)CSI.

In particular, the capabilities for a switching entity and a control entity according to the invention can be provided for Mobile Originating Calls in the MSCNLR when gsmSCF is invoked via O-CSI, Mobile Terminating Calls in GMSC when gsmSCF is invoked via T-CSI. Mobile Terminating Calls in MSCNLR when gsmSCF is invoked via VT-CSI, or Mobile Forwarding Calls in MSCNLR and GMSC when gsmSCF is invoked via O-CSI. A mobile call may also be subjected to N-CSI and D-CSI services and the inventive capabilities may also be applicable for such services. These are examples of call scenarios and are not meant to be exclusive.

The invention is furthermore embodied in devices which are described in more detail below in relation to FIGS. 13-15. Reference signs are used for illustration only and are not intended to be limiting.

Figure 13:
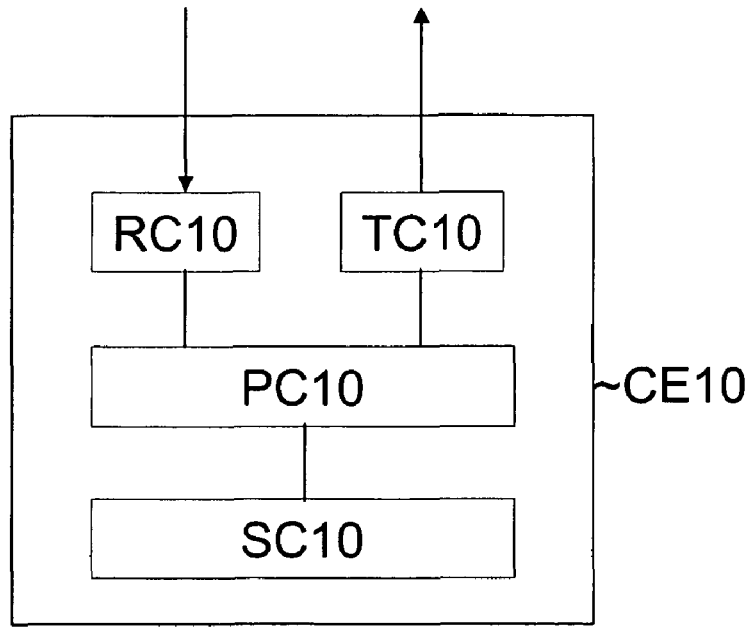
FIG. 13 is a functional block diagram schematically illustrating an embodiment of a control entity.

FIG. 13 depicts an embodiment of a control entity CE10 comprising a receiving unit RC10 for receiving messages, a transmitting unit TC10 for transmitting messages, a processing unit PC10 for processing messages and information, and preferably a storage unit SC10 for storing and/or obtaining of information.

The processing unit PC10 may be adapted to obtain information indicating a status of a bearer for the call, to determine a bearer establishment procedure for the call by analyzing the obtained information indicating the status of the bearer and at least one requirement related to the call, and to initiate a transmission via the transmission unit TC10 of an instruction to a switching entity to initiate an establishment of the bearer for the call according to the determined bearer establishment procedure.

The processing unit PC10 may be further adapted to process information indicating the status of the bearer for the call referring to a selection status of the bearer. Alternatively or in addition, the processing unit PC10 may be adapted to determine the bearer establishment procedure relating to a selection of at least one media gateway and/or at least one codec. The processing unit PC10 may be further adapted to initiate a sending, via transmission unit TC10, of an instruction for instructing the switching entity e.g. to perform a particular bearer establishment procedure, e.g. the instruction may relate to the initiation of a backward bearer establishment procedure or a forward bearer establishment procedure and may be implicit or explicit.

According to a preferred embodiment, the information indicating the status of the bearer is received at the receiving unit RC10 via an initial message comprising a dedicated information element for indicating the status of the bearer. Furthermore, the information indicating the status of the bearer may be received at the receiving unit RC10 from the switching entity. The processing unit PC10 may be adapted to process this status information. In particular, the processing unit PC10 may be adapted to extract the information from the message and to obtain the status of the bearer from the extracted information.

Alternatively or in addition, the information indicating the status of the bearer can be obtained by the processing unit PC10 from information indicating that the call is initiated by a unit of the control entity CE10, e.g. invoked by or under involvement of the processing unit PC10.

According to another preferred embodiment, the processing unit PC10 may be adapted to invoke an intelligent network service procedure for the call and to initiate a transmission to the switching entity via the transmission unit TC10 of at least one instruction to perform an operation relating to the invoked intelligent network service.

Furthermore, the receiving unit RC10 may be adapted to receive, subsequent to the sending of the instruction, at least one further information about a status of the bearer. According to a preferred embodiment, the processing unit PC10 may be adapted to process the at least one further information. In particular, the processing unit PC10 may be adapted to determine at least one further bearer establishment procedure for the call according to the received at least one further information and at least one further requirement related to the call and to initiate a transmission to the switching entity via the transmission unit TC10 of at least one further instruction to initiate an establishment of at least one further bearer according to the determined at least one further bearer establishment procedure. The at least one further bearer establishment procedure may relate to an establishment of at least one call leg for the call being a multiparty call.

Figure 14:
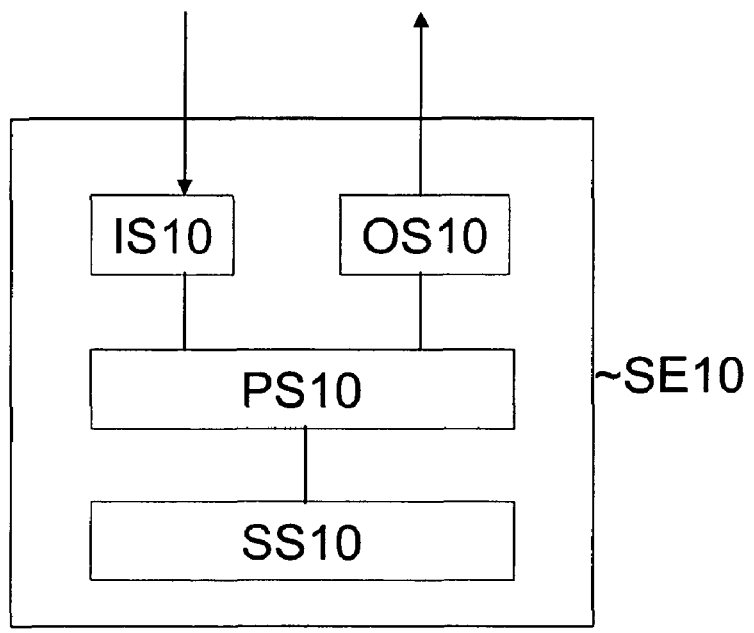
FIG. 14 is a functional block diagram schematically illustrating an embodiment of a switching entity.

An embodiment of a switching entity is depicted in FIG. 14. A switching entity SE10 comprises an input unit IS10, an output unit OS10, a processing unit PS10, and preferably a storage unit SS10.

A switching entity may be a stand alone device and input unit IS10 and output unit OS10 being external interfaces like a receiving unit for receiving messages and a transmission unit for transmitting messages, respectively. Preferably, a switching entity is operating at a switching server, e.g. as a hardware and/or software sub-unit of the switching server. The switching entity may be installed and operated at the switching server sharing none of the units IS10, OS10, PS10, SS10 with the switching server or sharing at least one of the units IS10, OS10. PS10, SS10 with units of a switching server comprising a receiving unit for receiving messages, a transmission unit for sending messages, a processing unit for processing messages and information, and preferably a storage unit. A preferred embodiment is a switching entity according to a computer program loaded into the processing unit of a switching server, thus sharing at least the processing unit with the input unit IS10.

For a call being initiated by a terminal, the processing unit PS10 may be adapted to determine a status of a bearer for a call. The call is to be set-up in an intelligent network comprising the switching entity SE10 and a control entity. The call is subjected to a control by the control entity. Furthermore, the processing unit PS10 may be adapted to initiate a sending, via the output unit OS10 to the control entity, of information about the determined status of the call, to receive via the input unit IS10 from the control entity an instruction to initiate an establishment of the bearer for the call according to a bearer establishment procedure determined by the control entity, and to initiate the establishment of the bearer according to the instruction.

According to preferred embodiment, the processing unit PS10 may be adapted to initiate a transmission, via output unit OS10, of the information indicating the status of the bearer via an initial message comprising a dedicated information element for indicating the status of the bearer.

According to another preferred embodiment, the processing unit PS10 is adapted to process the information indicating the status of the bearer for the call referring to a selection status of the bearer.

If the call is initiated by the control entity, the input unit IS10 may be adapted to receive an instruction to initiate an establishment of the bearer for the call according to a bearer establishment procedure determined by the control entity. The processing unit PS10 may be adapted to process the instruction and to initiate the establishment of the bearer accordingly.

According to another preferred embodiment, the processing unit PS10 is adapted to initiate the bearer establishment procedure relating to a selection of at least one media gateway and/or at least one codec.

According to another preferred embodiment, the processing unit PS10 is adapted to disable any pre-configured bearer establishment procedures for the call that is subjected to the control of the control entity at least until the instruction is received. The pre-configured bearer establishment procedure may be stored at the storage unit SS10.

According to another preferred embodiment, the input unit IS10 may be adapted to receive at least one instruction to perform an operation relating to an intelligent network service invoked by the control entity and the processing unit PS10 may be adapted to perform the instruction accordingly.

According to another preferred embodiment, the processing unit PS10 may be adapted to determine at least one status of the bearer subsequent to the initiation of the bearer and to initiate a sending via the output unit OS10 to the control entity of at least one further information about the at least one subsequently determined status of the bearer.

According to another preferred embodiment, in response to the sending of the at least one further information, the input unit IS10 may be adapted to receive from the control entity at least one further instruction to initiate an establishment of at least one further bearer for the call according to at least one further bearer establishment procedure determined by the control entity and the processing unit PS10 may be adapted to initiate the establishment of the at least one further bearer according to the at least one further instruction.

According to another preferred embodiment, the processing unit PS10 is adapted to initiate the at least one further bearer establishment procedure relating to an establishment of at least one call leg for the call being a multiparty call.

A control entity is typically embodied at a single device or may be distributed over several devices. The corresponding applies to a switching entity. A control entity and a switching entity may be implemented as separate functions on the same device or platform. A control entity may control multiple switching entities.

The present invention also concerns a computer program comprising portions of software codes in order to implement the method as described above when operated at a control entity or a switching entity. The computer program can be stored on a computer readable medium. The computer-readable medium can be a permanent or rewritable memory within the control entity or the switching entity or located externally. The computer program can be also transferred to the control entity or the switching entity for example via a cable or a wireless link as a sequence of signals.

A computer program loadable into a processing unit of a control entity may comprise code adapted to obtain information indicating a status of a bearer for the call, to determine a bearer establishment procedure for the call by analyzing the obtained information indicating the status of the bearer and at least one requirement related to the call, and to initiate a sending of an instruction to the switching entity to initiate an establishment of the bearer for the call according to the determined bearer establishment procedure.

The computer program may comprise further code adapted to perform any steps of a method as described herein as far as related to the control entity.

A computer program loadable into a processing unit of a switching entity may comprise code adapted to determine a status of a bearer for the call, to initiate a sending to the control entity of information about the determined status of the call, to process an instruction received from the control entity to initiate an establishment of the bearer for the call according to a bearer establishment procedure determined by the control entity, and to initiate the establishment of the bearer according to the instruction.

Alternatively or in addition, a computer program loadable into a processing unit of a switching entity may comprise code to process an instruction received from the control entity to initiate an establishment of the bearer for the call according to a bearer establishment procedure determined by the control entity and to initiate the establishment of the bearer according to the instruction.

The computer program(s) may comprise further code adapted to perform any steps of a method as described herein as far as related to the switching entity.

The invention claimed is:

1. A method for set-up of a call in an intelligent network comprising a switching entity and a control entity, the call being subjected to a control by the control entity wherein the following steps are performed by the control entity:
    obtaining information indicating a status of a bearer for the call,
    determining a bearer establishment procedure for the call by analyzing the obtained information indicating the status of the bearer and at least one requirement related to the call,
    sending an instruction to the switching entity to initiate an establishment of the bearer for the call according to the determined bearer establishment procedure;
    subsequent to the sending of the instruction to initiate the establishment of the bearer for the call, receiving at least one further information about a status;
    determining at least one further bearer establishment procedure for the call according to the received at least one further information and at least one further requirement related to the call, and
    sending at least one further instruction to the switching entity to initiate an establishment of at least one further bearer according to the determined at least one further bearer establishment procedure.

2. The method according to claim 1, wherein the information indicating the status of the bearer for the call refers to a selection status of the bearer.

3. The method according to claim 1, wherein the bearer establishment procedure relates to a selection of at least one media gateway or at least one codec.

4. The method according to claim 1, wherein the information indicating the status of the bearer is received via an initial message comprising a dedicated information element for indicating the status of the bearer.

5. The method according to claim 1, wherein the information indicating the status of the bearer is received from the switching.

6. The method according to claim 1, wherein the information indicating the status of the bearer is obtained from information indicating that the call is initiated by the control entity.

7. The method according to claim 1, further comprising the step of
- invoking an intelligent network service procedure for the call,
- sending at least one instruction to perform an operation relating to the invoked intelligent network service to the switching entity.

8. The method according to claim 1, wherein the at least one further bearer establishment procedure relates to an establishment of at least one call leg for the call being a multiparty call.

9. A method for set-up of a call in an intelligent network comprising a switching entity and a control entity, the call being subjected to a control by the control entity, the method comprising the following steps as performed by the switching entity when the call is initiated by the control entity:
- receiving from the control entity an instruction to initiate an establishment of a bearer for the call according to a bearer establishment procedure determined by the control entity,
- initiating the establishment of the bearer according to the instruction;
- determining at least one status of the bearer subsequent to the initiation of the bearer;
- sending to the control entity at least one further information about the at least one subsequently determined status of the bearer;
- receiving, in response to the sending of the at least one further information, from the control entity at least one further instruction to initiate an establishment of at least one further bearer for the call according to at least one further bearer establishment procedure determined by the control entity, and
- initiating the establishment of the at least one further bearer according to the at least one further instruction.

10. The method according to claim 9, wherein the bearer establishment procedure relates to a selection of at least one media gateway and/or at least one codec.

11. The method according to claim 9, further comprising the step of
- disabling any pre-configured bearer establishment procedures for the call at least until the instruction is received.

12. The method according to claim 9, further comprising the step of
- receiving at least one instruction to perform an operation relating to an intelligent network service invoked by the control entity.

13. The method according to claim 9, wherein the at least one further bearer establishment procedure relates to an establishment of at least one call leg for the call being a multiparty call.

14. A control entity for setting up a call in an intelligent network comprising a switching entity and a control entity, the call being subjected to a control by the control entity, the control entity comprising means:
- for obtaining information indicating a status of a bearer for the call;
- for determining a bearer establishment procedure for the call by analyzing the obtained information indicating the status of the bearer and at least one requirement related to the call;
- for sending an instruction to the switching entity to initiate an establishment of the bearer for the call according to the determined bearer establishment procedure;
- for receiving at least one further information about a status of the bearer subsequent to the sending of the instruction to initiate the establishment of the bearer for the call;
- for determining at least one further bearer establishment procedure for the call according to the received at least one further information and at least one further requirement related to the call; and
- for sending at least one further instruction to the switching entity to initiate an establishment of at least one further bearer according to the determined at least one further bearer establishment procedure.

15. The control entity according to claim 14, wherein the information indicating the status of the bearer for the call refers to a selection status of the bearer.

16. The control entity according to claim 14, wherein the bearer establishment procedure relates to a selection of at least one media gateway or at least one codec.

17. The control entity according to claim 14, wherein the information indicating the status of the bearer is received via an initial message comprising a dedicated information element for indicating the status of the bearer.

18. The control entity according to claim 14, wherein the information indicating the status of the bearer is received from the switching entity.

19. The control entity according to claim 14, wherein the information indicating the status of the bearer is obtained from information indicating that the call is initiated by the control entity.

20. The control entity according to claim 14, further comprising means for:
- invoking an intelligent network service procedure for the call and
- sending at least one instruction to perform an operation relating to the invoked intelligent network service to the switching entity.

21. The control entity according to claim 14, wherein the means for determining one further bearer establishment procedure relates to an establishment of at least one call leg for the call being a multiparty call.

22. In a telecommunications network, a switching entity and a control entity for setting up a call in an intelligent network, the call being subjected to a control by the control entity, the switching entity comprising means for:
- determining a status of a bearer for the call;
- sending to the control entity information about the determined status of the call;
- receiving from the control entity an instruction to initiate an establishment of the bearer for the call according to a bearer establishment procedure determined by the control entity; and
- initiating the establishment of the bearer according to the instruction;
- receiving at least one further information about a status of the bearer subsequent to the sending of the instruction to initiate the establishment of the bearer for the call;
- determining at least one further bearer establishment procedure for the call according to the received at least one further information and at least one further requirement related to the call; and
- sending at least one further instruction to the switching entity to initiate, an establishment of at least one further bearer according to the determined at least one further bearer establishment procedure.

23. The switching entity according to claim 22, wherein the information indicating the status of the bearer is sent via an initial message comprising a dedicated information element for indicating the status of the bearer.

24. The switching entity according to claim 22, wherein the information indicating the status of the bearer for the call refers to a selection status of the bearer.

* * * * *

UNITED STATES PATENT AND TRADEMARK OFFICE
CERTIFICATE OF CORRECTION

| | | |
|---|---|---|
| PATENT NO. | : 8,078,169 B2 | Page 1 of 1 |
| APPLICATION NO. | : 11/945959 | |
| DATED | : December 13, 2011 | |
| INVENTOR(S) | : Maione et al. | |

It is certified that error appears in the above-identified patent and that said Letters Patent is hereby corrected as shown below:

In Column 1, Line 10, delete "networks." and insert -- networks, --, therefor.

In Column 3, Line 60, delete "the" and insert -- The --, therefor.

In Column 5, Line 14, delete "dedicated." and insert -- dedicated, --, therefor.

In Column 5, Line 43, delete "servicer" and insert -- service, --, therefor.

In Column 8, Line 29, delete "entity;" and insert -- entity; and --, therefor.

In Column 11, Line 39, delete "MSCNLR," and insert -- MSC/VLR, --, therefor.

In Column 11, Line 42, delete "MSV/VLR" and insert -- MSC/VLR --, therefor.

In Column 12, Line 67, delete "MGW" and insert -- MGW. --, therefor.

In Column 13, Line 4, delete "disabled." and insert -- disabled, --, therefor.

In Column 13, Line 25, delete "MSCNLR" and insert -- MSC/VLR --, therefor.

In Column 13, Line 30, delete "MSCNLR" and insert -- MSC/VLR --, therefor.

In Column 13, Line 31, delete "MSCNLR" and insert -- MSC/VLR --, therefor.

In Column 14, Line 44, delete "FIG. 8" and insert -- FIG. 8. --, therefor.

In Column 15, Line 15, delete "MSCNLR" and insert -- MSC/VLR --, therefor.

In Column 16, Line 1, delete "MSCNLR" and insert -- MSC/VLR --, therefor.

In Column 17, Line 15, delete "MSCNLR" and insert -- MSC/VLR --, therefor.

In Column 17, Line 18, delete "MSCNLR" and insert -- MSC/VLR --, therefor.

In Column 17, Line 19, delete "MSCNLR" and insert -- MSC/VLR --, therefor.

In Column 18, Line 42, delete "OS10." and insert -- OS10, --, therefor.

In Column 20, Line 64, in Claim 5, delete "switching." and insert -- switching entity. --, therefor.

In Column 22, Line 55, in Claim 22, delete "initiate," and insert -- initiate --, therefor.

Signed and Sealed this
Ninth Day of April, 2013

Teresa Stanek Rea
*Acting Director of the United States Patent and Trademark Office*